United States Patent
Krishnamoorthy et al.

(10) Patent No.: US 11,783,453 B2
(45) Date of Patent: Oct. 10, 2023

(54) ADAPTING IMAGE NOISE REMOVAL MODEL BASED ON DEVICE CAPABILITIES

(71) Applicant: Bank of America Corporation, Charlotte, NC (US)

(72) Inventors: MadhuSudhanan Krishnamoorthy, Tamil Nadu (IN); Ramaswamy M, Tamil Nadu (IN)

(73) Assignee: Bank of America Corporation, Charlotte, NC (US)

( * ) Notice: Subject to any disclaimer, the term of this patent is extended or adjusted under 35 U.S.C. 154(b) by 351 days.

(21) Appl. No.: 17/344,360

(22) Filed: Jun. 10, 2021

(65) Prior Publication Data

US 2022/0398694 A1 Dec. 15, 2022

(51) Int. Cl.
*G06T 5/00* (2006.01)
*G06N 3/08* (2023.01)
*G06V 30/414* (2022.01)
*G06N 3/045* (2023.01)

(52) U.S. Cl.
CPC ............ *G06T 5/002* (2013.01); *G06N 3/045* (2023.01); *G06N 3/08* (2013.01); *G06V 30/414* (2022.01); *G06T 2207/20081* (2013.01); *G06T 2207/20084* (2013.01)

(58) Field of Classification Search
CPC .......... G06T 5/002; G06T 2207/20081; G06T 2207/20084; G06T 2207/20008; G06N 3/045; G06N 3/08; G06N 3/082; G06V 30/414; G06V 30/164; G06V 30/41
See application file for complete search history.

(56) References Cited

U.S. PATENT DOCUMENTS

| | | | |
|---|---|---|---|
| 6,640,145 B2 | 10/2003 | Hoffberg et al. |
| 6,934,056 B2 | 8/2005 | Gindele et al. |
| 7,076,113 B2 | 7/2006 | Le Dinh |
| 7,116,838 B2 | 10/2006 | Gindele et al. |
| 7,289,652 B2 | 10/2007 | Florent et al. |

(Continued)

OTHER PUBLICATIONS

A. Marchisio et al., "Deep Learning for Edge Computing: Current Trends, Cross-Layer Optimizations, and Open Research Challenges," 2019 IEEE Computer Society Annual Symposium on VLSI (ISVLSI), Miami, FL, USA, 2019, pp. 553-559, doi: 10.1109/ISVLSI.2019.00105. (Year: 2019).*

(Continued)

*Primary Examiner* — Andrae S Allison

(57) ABSTRACT

A system for adapting an image noise removal model based on a device processing capability receives, from a computing device, a request to adapt an image noise removal module for the computing device. The system compares a processing capability of the computing device with a threshold processing capability. The system determines whether the processing capability is greater or smaller than the threshold processing capability. In response to determining that the processing capability is greater than the threshold processing capability, the system sends a version of the image noise removal module that is adapted for computing devices with processing capabilities less than the threshold processing capability, where the version of the image noise removal module is adapted to have a number of neural network layers less than a threshold number of neural network layers.

20 Claims, 9 Drawing Sheets

(56) References Cited

U.S. PATENT DOCUMENTS

| | | |
|---|---|---|
| 7,369,165 B2 | 5/2008 | Bosco et al. |
| 7,477,777 B2 | 1/2009 | Wells |
| 7,570,287 B2 | 8/2009 | Tsuruoka |
| 7,660,481 B2 | 2/2010 | Schaap et al. |
| 7,715,050 B2 | 5/2010 | Topfer et al. |
| 7,852,402 B2 | 12/2010 | Mcgarvey et al. |
| 7,884,863 B2 | 2/2011 | Nakami et al. |
| 7,889,950 B2 | 2/2011 | Milanfar et al. |
| 8,059,910 B2 | 11/2011 | Ishiga |
| 8,127,886 B2 | 3/2012 | Utsunomiya |
| 8,131,097 B2 | 3/2012 | Lelescu et al. |
| 8,160,149 B2 | 4/2012 | Demos |
| 8,228,410 B2 | 7/2012 | Raynor et al. |
| 8,370,362 B2 | 2/2013 | Szabo |
| 8,422,736 B2 | 4/2013 | Kmiecik et al. |
| 8,488,015 B2 | 7/2013 | Prentice et al. |
| 8,644,616 B2 | 2/2014 | Chaki et al. |
| 8,705,827 B2 | 4/2014 | Zhu et al. |
| 8,731,337 B2 | 5/2014 | Lin et al. |
| 8,878,759 B2 | 11/2014 | Crossland et al. |
| 8,942,780 B2 | 1/2015 | Scully et al. |
| 8,989,517 B2 | 3/2015 | Morgan-Mar et al. |
| 9,036,885 B2 | 5/2015 | Elad et al. |
| 9,097,663 B2 | 8/2015 | Updyke et al. |
| 9,171,355 B2 | 10/2015 | Zhuo et al. |
| 9,225,943 B2 | 12/2015 | Li et al. |
| 9,332,953 B2 | 5/2016 | Suzuki |
| 9,684,815 B2 | 6/2017 | Walch et al. |
| 9,710,896 B2 | 7/2017 | Lim et al. |
| 9,749,551 B2 | 8/2017 | Geiss et al. |
| 9,756,264 B2 | 9/2017 | Hoelter et al. |
| 9,807,319 B2 | 10/2017 | Teich et al. |
| 9,858,659 B2 | 1/2018 | Minakawa et al. |
| 9,900,526 B2 | 2/2018 | Kostrzewa et al. |
| 9,986,175 B2 | 5/2018 | Frank et al. |
| 10,094,649 B2 | 10/2018 | Bagherinia |
| 10,218,972 B2 | 2/2019 | Lim et al. |
| 10,244,981 B2 | 4/2019 | Mir et al. |
| 10,265,004 B2 | 4/2019 | Yamaguchi et al. |
| 10,311,567 B2 | 6/2019 | Gurevich |
| 10,321,031 B2 | 6/2019 | Frank et al. |
| 10,327,494 B2 | 6/2019 | Sights et al. |
| 10,445,555 B2 | 10/2019 | Walch et al. |
| 10,827,033 B1* | 11/2020 | Balasubramanian ........................ G06F 9/5072 |
| 11,050,813 B2* | 6/2021 | Sabella .................. H04L 67/10 |
| 11,163,604 B2* | 11/2021 | Balasubramanian ........................ G06F 9/4862 |
| 11,330,145 B1* | 5/2022 | Krishnamoorthy .......................... G06V 30/1916 |
| 11,374,776 B2* | 6/2022 | Guim Bernat ...... H04L 63/0428 |
| 11,687,370 B2* | 6/2023 | Nagar ................... G06F 9/5027 718/104 |
| 2005/0163368 A1* | 7/2005 | Hanamoto ............... G06T 5/40 382/168 |
| 2014/0267790 A1* | 9/2014 | Rabii ................... H04N 23/617 348/207.1 |
| 2016/0012136 A1* | 1/2016 | Ben Zvi ............. G06F 16/9535 707/770 |
| 2019/0251571 A1 | 8/2019 | O'Reilly et al. |
| 2020/0089184 A1 | 3/2020 | Shapiro et al. |
| 2021/0218880 A1* | 7/2021 | Mizumori .............. H04N 23/81 |
| 2022/0398407 A1* | 12/2022 | Krishnamoorthy .. G06V 30/418 |
| 2022/0398900 A1* | 12/2022 | Krishnamoorthy .. G06V 30/164 |

OTHER PUBLICATIONS

P. Liu, M. Wang, L. Wang and W. Han, "Remote-Sensing Image Denoising With Multi-Sourced Information," in IEEE Journal of Selected Topics in Applied Earth Observations and Remote Sensing, vol. 12, No. 2, pp. 660-674, Feb. 2019, doi: 10.1109/JSTARS.2019.2891566. (Year: 2019).*

Ozer et al, Offloading Deep Learning Powered Vision Tasks From UAV to 5G Edge Server With Denoising, IEEE Transactions On Vehicular Technology, vol. 72, No. 6, Jun. 2023 (Year: 2023).*

Ran, Xukan, et al. "Delivering deep learning to mobile devices via offloading." Proceedings of the Workshop on Virtual Reality and Augmented Reality Network. 2017. (Year: 2017).*

* cited by examiner

ADAPTING IMAGE NOISE REMOVAL MODEL BASED ON DEVICE CAPABILITIES

TECHNICAL FIELD

The present disclosure relates generally to data processing and load balancing, and more specifically to adapting image noise removal model based on device capabilities.

BACKGROUND

The information displayed on images may be obstructed by noise artifacts, such as logo shapes, background dots (i.e., "salt and pepper noise"), and/or hand-written notes. In some cases, as a consequence of an image containing a noise artifact, information displayed on a corresponding portion of the image may become unrecognizable. It is challenging to detect and remove such noise artifacts. The current image analysis and processing technologies are prone to mistakenly removing a desired item (e.g., a letter, a number, etc.) on an image instead of a noise artifact. The current image analysis and processing technologies may also mistakenly leave the noise artifact or at least a portion of the noise artifact on the image. Current image analysis and processing technologies are not configured to provide a reliable and efficient method for removing noise artifacts from images.

SUMMARY

Current image analysis and processing technologies are not configured to provide a reliable and efficient method for removing noise artifacts from images. This disclosure contemplates systems and methods for removing noise artifacts from images. This disclosure contemplates removing any type of noise artifact from an image, such as shapes, background logos, numbers, letters, symbols, background dots, and/or any other noise artifact that at least partially obstructs one or more portions of an image.

To detect noise artifacts on a particular image, the disclosed system is trained based on a training clean image that is free of the noise artifacts, and a training image that contains a noise artifact. During the training process, The disclosed system is fed the training clean image and the training image that contains a noise artifact. The disclosed system extracts a first set of features from the training clean image, where the first set of features represent shapes, text, symbols, numbers, and any other item that is displayed on the training clean image. Similarly, the disclosed system extracts a second set of features from the image that contains the noise artifact.

The disclosed system compares each of the first set of features with a counterpart feature from the second set of features. The disclosed system determines whether each of the first set of features corresponds to its counterpart feature from the second set of features. The disclosed system determines that a feature from the first set of features corresponds to its counterpart feature from the second set of features if the feature from the first set of features is within a threshold range (e.g., ±5%, ±10%, etc.) of its counterpart feature from the second set of features. In this manner, the disclosed system determines the difference between the first set of features (associated with the training clean image) and the second set of features (associated with the image that contains the noise artifact). Thus, the disclosed system determines that this difference corresponds to features representing the noise artifact displayed on the training image, i.e., noise artifact features. Once the disclosed system is trained, the disclosed system can detect the noise artifact features in any other image.

Upon detecting the noise artifact features on an image, the disclosed system is configured to remove the noise artifact features from the first set of features (associated with the image that contains the noise artifact). In one embodiment, the disclosed system may remove the noise artifact features from the first set of features by identifying particular numerical values representing the noise artifact features from a vector that comprises numerical values representing the first set of features, and filtering the particular numerical values such that they are excluded from the output. For example, the disclosed system may remove the noise artifact features from the first set of features by feeding the vector that represents the first set of features to a neural network dropout layer whose perceptrons that compute numerical values representing the noise artifact features are disconnected from the output.

In one embodiment, a system for removing noise artifacts from an image comprises a memory and a processor. The memory is operable to store a training clean image of a document, wherein the training clean image is free of noise artifacts. The processor is operably coupled with the memory. The processor receives an image of the document, where the image contains a noise artifact at least partially obstructing a portion of the image. The processor extracts a first set of features from the image, where the first set of features represents at least one of the shapes, symbols, numbers, and text in the image. The processor identifies noise artifact features from the first set of features, where the noise artifact features represent pixel values of the noise artifact. The processor generates a second set of features by removing the noise artifact features from the first set of features. The processor generates a test clean image of the document based at least in part upon the second set of features as an input. The processor compares a portion of the test clean image that previously displayed the noise artifact with a counterpart portion of the training clean image to determine whether the noise artifact is removed from the test clean image. The processor determines whether the portion of the test clean image that previously displayed the noise artifact corresponds to the counterpart portion of the training clean image. In response to determining that the portion of the test clean image that previously displayed the noise artifact corresponds to the counterpart portion of the training clean image, the processor outputs the test clean image of the document.

This disclosure further contemplates an unconventional edge device that is configured to detect and remove noise artifacts from images and/or documents. For example, the edge device may comprise a computing device, such as a scanner.

With respect to an edge device for detecting and removing noise artifacts from documents, the device comprises a memory, an array of sensors, and a processor. The memory is operable to store a training clean image of a document, where the training clean image is free of noise artifacts. The array of sensors is configured to scan the document, where the array of sensors captures a scan of the document. The processor is operably coupled with the memory and the array of sensors. The processor is configured to receive, from the array of sensors, the scan of the document, where the document contains a noise artifact at least partially obstructing a portion of the document. The processor generates an image of the document from the scan of the document. The processor extracts a first set of features from the image, where the first set of features represents at least one of shapes, symbols, numbers, and text in the image. The processor identifies noise artifact features from the first set of features, where the noise artifact features represent pixel values of the noise artifact. The processor generates a second set of features by removing the noise artifact features from the first set of features. The processor generates a test clean image of the document based at least in part upon the second set of features as an input. The processor compares the portion of the test clean image that previously displayed the noise artifact with a counterpart portion of the training clean image to determine whether the noise artifact is removed from the test clean image. The processor determines whether the portion of the test clean image that previously displayed the noise artifact corresponds to the counterpart portion of the training clean image. In response to determining that the portion of the test clean image that previously displayed the noise artifact corresponds to the counterpart portion of the training clean image, the processor outputs the test clean image of the document.

This disclosure further contemplates an unconventional Automated Teller Machine (ATM) that is configured to detect and remove security vulnerabilities in documents by removing noise artifacts from the documents. For example, the documents may comprise checks, gift cards, travel checks, and/or the like. In a particular example where the document comprises a check, the document comprises one or more data items, such as a sender's name, a receiver's name, a sender's signature, an amount, a sender's account number, a receiver's account number, among other information associated with the document. The ATM receives a transaction request when a user inserts the document (e.g., the check) into the ATM. For example, assume that the document contains a noise artifact that at least partially obstructs a portion of the document. The ATM generates an image of the document, and determines whether the noise artifact at least partially obstructs one or more data items displayed on the document including those listed above. If the ATM determines that the noise artifact at least partially obstructs the one or more data items on the document, the ATM removes the noise artifact from the document image. In this manner, the ATM detects and removes potential security vulnerabilities as a consequence of the noise artifact obstructing one or more data items on the document, such as sender's signature mismatching, sender's name mismatching, account number mismatching, receiver's name mismatching, amount mismatching, serial number mismatching, etc. Once the noise artifact is removed from the document image, the ATM determines whether the document (e.g., the check) is valid by determining whether the check has already been deposited or not. If the check has not been deposited yet, the ATM deposits the check into an account of the user.

With respect to an ATM for detecting and removing security vulnerabilities from documents by removing noise artifacts from the document, the ATM comprises a memory and a processor. The memory is operable to store a training clean image of a document. The training clean image is free of noise artifacts. The training clean image displays at least one of a first sender's name, a first receiver's name, and a first number representing a first amount associated with the document. The processor is operably coupled with the memory. The processor receives a transaction request when the document is inserted into the ATM, wherein the document contains a noise artifact at least partially obstructing a portion of the document. The processor generates an image of the document by scanning the document, where the image displays at least one of a second sender's name, a second receiver's name, and a second number representing a second amount. The processor determines whether the noise artifact at least partially obstructs the one or more of the second sender's name, the second receiver's name, and the second number representing the second amount. In response to determining that the noise artifact at least partially obstructs the one or more of the second sender's name, the second receiver's name, and the second number representing the second amount, the processor generates a test clean image of the document by removing the noise artifact from the image. The processor compares a portion of the test clean image that previously displayed the noise artifact with a counterpart portion of the training clean image to determine whether the noise artifact is removed from the test clean image. The processor determines whether the portion of the test clean image that previously displayed the noise artifact corresponds to the counterpart portion of the training clean image. In response to determining that the portion of the test clean image that previously displayed the noise artifact corresponds to the counterpart portion of the training clean image, the processor approves the transaction request.

This disclosure further contemplates adapting an image noise removal module for a computing device based on the processing capability of the computing device. Various computing devices, such as laptops, scanners, mobile devices, ATMs, etc., have different processing capabilities. For example, a computing device that has a low processing capability (e.g., capable of executing below 500 instructions per second) does not have sufficient processing capability for processing the image noise removal module that requires a high processing capability (e.g., 2000 instructions per second). Thus, the disclosed system adapts the image noise removal module for each computing device based on the processing capability of that computing device. The disclosed system classifies the various computing devices based on their processing capability ranges, and adapts the image noise removal module according to different ranges of each computing device's processing capabilities. For example, for computing devices that have processing capabilities below a threshold processing capability (e.g., within a first processing capability range), the disclosed system generates a first version of the image noise removal module by adapting the image noise removal module, such that the first version of the image noise removal module is implemented by a first number of neural network layers less than a threshold number. In another example, the first version of the image noise removal module may be implemented with an iteration number to repeat the noise artifact removing process and determine whether the noise artifact is removed less than a threshold iteration number.

With respect to a system for adapting an image noise removal module for a computing device based on the processing capability of the computing device, the system comprises a computing device and a server. The computing device has a processing capability, where the processing capability is measured based at least in part upon an average number of instructions that the computing device processes per second. The server is communicatively coupled with the computing device. The server comprises a memory and a processor. The memory is operable to store a first version of an image noise removal model having a first number of neural network layers. The image noise removal model is configured to remove noise artifacts from images. The first number of neural network layers is more than a threshold number of neural network layers. The first version of the image noise removal model is known to be used by devices having processing capabilities more than a threshold processing capability. The processor is operably coupled with the memory. The processor receives, from the computing device, a request to adapt the image noise removal model for the computing device, wherein the request comprises an indication information indicating the first processing capability. The processor compares the processing capability with the threshold processing capability. The processor determines whether the processing capability is greater than the threshold processing capability. In response to determining that the processing capability is greater than the threshold processing capability, the processor communicates the first version of the image noise removal model to the computing device.

The disclosed system provides several practical applications and technical advantages which include: 1) technology that detects noise artifacts displayed on an image, where the noise artifact may include shapes, background logos, numbers, letters, symbols, background dots, and/or any other noise artifact that at least partially obstructs one or more portions of an image; 2) technology that removes noise artifact features representing the noise artifact, e.g., by identifying and filtering particular numerical values representing the noise artifact features from a vector representing features of the image, such that the particular numerical values are excluded from the output; 3) technology that determines whether a document (e.g., a check) is valid by detecting and removing noise artifacts from the document, and comparing information presented on the document, e.g., a sender's name, a receiver's name, a serial number, and/or a signature with corresponding information previously stored in a database; and 4) technology that adapts an image noise removal module for a device based on a processing capability of the device.

As such, the disclosed system may improve the current image analysis and processing technologies by detecting and removing noise artifacts from images. The disclosed system may be integrated into a practical application of restoring information (e.g., confidential information) displayed on the images and documents that are obstructed or have become unrecognizable as a consequence of a noise artifact obstructing a relative portion of those images and documents where the information has become unrecognizable. The disclosed system may further be integrated into an additional practical application of improving underlying operations of computer systems tasked to detect and remove noise artifacts from images and/or documents. For example, the disclosed system reduces processing, memory, and time resources for detecting and removing noise artifacts from the images and/or documents that would otherwise be spent using the current image analysis and processing technologies.

In another example, by adapting the image noise removal module for each device based on the processing capability of each device, each device is not overloaded to perform removing noise artifacts from an image and/or document, by a version of the image noise removal module that requires a large amount of processing capability that the device does not have. This, in turn, provides an additional practical application of load balancing for various devices based on their corresponding processing capabilities.

The disclosed system may further be integrated into an additional practical application of improving security vulnerability detection in documents (e.g., checks), where those security vulnerabilities have been caused as a consequence of the noise artifacts at least partially obstructing a portion of such documents. For example, by detecting and removing noise artifacts from a document, security vulnerabilities, such as sender's signature mismatching, sender's name mismatching, account number mismatching, receiver's name mismatching, amount mismatching, serial number mismatching, etc. may be avoided or minimized.

The disclosed system may further be integrated into an additional practical application of providing technical improvements to various computer systems, such as desktop computers, mobile phones, scanners, and ATMs to detect and remove noise artifacts from images. This provides additional practical application of utilizing less processing and memory resources to process "noisy images" or images with noise artifacts that would otherwise be spent using the current image processing technologies.

The disclosed system may further be integrated into an additional practical application of improving information security technology by removing the noise artifacts that caused security vulnerabilities, e.g., data mismatching between the noisy image and the original image, and processing the clean image, thus avoiding or minimizing security vulnerabilities.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
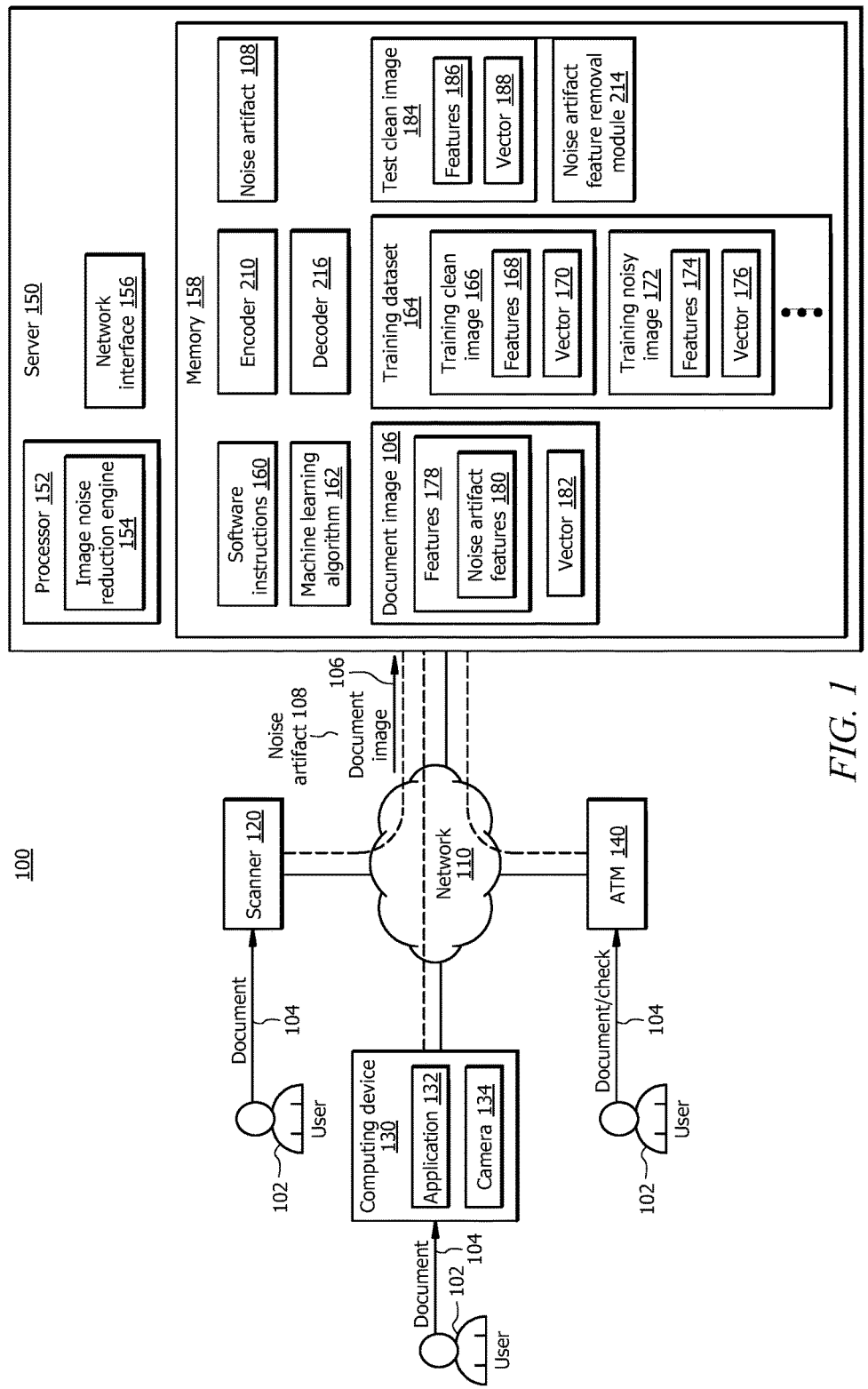
FIG. 1 illustrates an embodiment of a system configured for removing noise artifacts from images.

As described above, previous technologies fail to provide efficient, reliable, and safe solutions for detecting and removing noise artifacts from images and/or documents. This disclosure provides various systems, devices, and methods for detecting and removing noise artifacts from images and documents. In one embodiment, system 100 and method 300 for removing noise artifacts from images are described in FIGS. 1-2 and 3. respectively. In one embodiment, edge device 400 and method 500 for detecting and removing noise artifacts from documents are described in FIGS. 4 and 5, respectively. In one embodiment, system 600 and method 700 for detecting and removing security vulnerabilities by removing noise artifacts from documents by an ATM are described in FIGS. 6 and 7. In one embodiment, system 800 and method 900 for adapting an image noise removal model based on a device's processing capability are described in FIGS. 8 and 9.

Example System for Detecting and Removing Noise Artifacts from Images

FIG. 1 illustrates one embodiment of a system 100 that is configured to detect and remove noise artifacts 108 from images 106. In one embodiment, system 100 comprises a server 150. In some embodiments, system 100 further comprises a network 110, a scanner 120, a computing device 130, and an Automated Teller Machine (ATM) 140. Network 110 enables communications between components of system 100. Server 150 comprises a processor 152 in signal communication with a memory 158. Memory 158 stores software instructions 160 that when executed by the processor 152 cause the processor 152 to perform one or more functions described herein. For example, when the software instructions 160 are executed, the processor 152 executes an image noise reduction engine 154 to detect and remove noise artifacts 108 from an image 106. This disclosure contemplates that the image noise reduction engine 154 is capable of identifying and removing any type of noise artifact 108 that at least partially obstructs a portion of the image 106, including, logo shapes, letters, numbers, symbols, watermarks, and background dots. In other embodiments, system 100 may not have all of the components listed and/or may have other elements instead of, or in addition to, those listed above.

System Components

Network 110 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Scanner 120 may be any type of scanner 120, and is generally configured to receive a document 104 (e.g., a paper, a physical image, and/or the like), scan the document 104, and generate a digital copy or image 106 representing the document 104. Optionally, the scanner 120 may output a print of the digital image 106 of the document 104, similar to a copier. The scanner 120 may include a user interface, such as a keypad, a display screen, or other appropriate terminal equipment usable by user 102. The scanner 120 may include a hardware processor, memory, and/or circuitry configured to perform any of the functions or actions of the scanner 120 described herein. For example, a software application designed using software code may be stored in the memory and executed by the processor to perform the functions of the scanner 120. In one embodiment, the scanner 120 may use a charge-coupled device (CCD) array to scan the document 104. In some cases, the CCD array may introduce noise artifacts 108 to the image 106. For example, due to a low quality of the CCD array, while the document 104 is being scanned by the scanner 120, the CCD array may introduce noise artifacts 108, such as noise particles that are at least partially obstructing a portion of the image 106. In some cases, the document 104 may already contain one or more noise artifacts 108.

In one embodiment, upon obtaining the document image 106, the user 102 may send the document image 106 to the server 150 for processing. In an alternative embodiment, the processor of the scanner 120 may include the image noise reduction engine 154 (or a condensed or an edge version of the image noise reduction engine 154). As such, the scanner 120 may perform removing the noise artifacts 108 from the document image 106. This process is described further below in FIGS. 4 and 5.

Computing device 130 is generally any device that is configured to process data and interact with users 102. Examples of computing device 130 include, but are not limited to, a personal computer, a desktop computer, a workstation, a server, a laptop, a tablet computer, a mobile phone (such as a smartphone), etc. The computing device 130 may include a user interface, such as a camera 134, a display, a microphone, keypad, or other appropriate terminal equipment usable by user 102. The computing device 130 may include a hardware processor, memory, and/or circuitry configured to perform any of the functions or actions of the computing device 130 described herein. For example, a software application designed using software code may be stored in the memory and executed by the processor to perform the functions of the computing device 130.

Application 132 may be available on the computing device 130. For example, the application 132 may be stored in the memory of the computing device 130 and executed by the processor of the computing device 130. The application 132 may be a software, a mobile, and/or a web application 132 that is generally configured to receive an image of the document 104. For example, the user 102 may use the camera 134 to capture a document image 106. In some cases, the document image 106 may contain noise artifacts 108.

In one embodiment, the user 102 may then upload the document image 106 to the application 132, for example, sending the document image 106 to the server 150 to remove the noise artifacts 108. In an alternative embodiment, the processor of the computing device may include the image noise reduction engine 154 (or a condensed or edge version of the image noise reduction engine 154). As such, the computing device 130 may perform removing the noise artifacts 108. This process is described further below.

ATM 140 is generally any automated dispensing device configured to dispense items when users interact with the ATM 140. For example, the ATM 140 may comprise a terminal device for dispensing cash, tickets, scrip, travelers' checks, airline tickets, gaming materials, other items of value, etc. In one embodiment, ATM 140 is an automated teller machine that allows users 102 to withdraw cash, check balances, or make deposits interactively using, for example, a magnetically encoded card, a check, etc., among other services that the ATM 140 provides. The ATM 140 may include a user interface, such as a keypad, a slot, a display screen, a cash dispenser, among others. The user 102 may interact with the ATM 140 using its user interfaces. The ATM 140 may include a hardware processor, memory, and/or circuitry configured to perform any of the functions or actions of the ATM 140 described herein. For example, a software application designed using software code may be stored in the memory and executed by the processor to perform the functions of the ATM 140.

In one embodiment, the ATM 140 may send the document 104 to the server 150 to remove its noise artifacts 108. In an alternative embodiment, the processor of the ATM 140 may include the image noise reduction engine 154 (or a condensed or edge version of the image noise reduction engine 154). As such, the ATM 140 may perform removing the noise artifacts 108. This process is described further below in FIGS. 6 and 7. For example, when the user 102 inserts a document/check 104 into a slot of the ATM 140, during verifying the document 104 (e.g. check 104), the processor of the ATM 140 may execute the image noise reduction engine 154 to remove noise artifacts 108 from the document 104 (e.g. check 104). As such, security vulnerabilities as a consequence of noise artifacts 108 on the document 104, such as signature mismatching, sender's name mismatching, receiver's name mismatching, among other mismatching may be reduced or eliminated.

Server

Server 150 is generally a server or any other device configured to process data and communicate with computing devices (e.g., scanner 120, computing device 130, and ATM 140), databases, systems, and/or domain(s), via network 110. The server 150 is generally configured to oversee operations of the image noise reduction engine 154 as described further below.

Processor 152 comprises one or more processors operably coupled to the memory 158. The processor 152 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 152 may be a programmable logic device, a microcontroller, a microprocessor, or any suitable combination of the preceding. The one or more processors are configured to process data and may be implemented in hardware or software. For example, the processor 152 may be 8-bit, 16-bit, 32-bit, 64-bit, or of any other suitable architecture. The processor 152 may include an arithmetic logic unit (ALU) for performing arithmetic and logic operations, processor 152 registers the supply operands to the ALU and stores the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 160) to implement the image noise reduction engine 154. In this way, processor 152 may be a special-purpose computer designed to implement the functions disclosed herein. In an embodiment, the processor 152 is implemented using logic units, FPGAs, ASICs, DSPs, or any other suitable hardware. The processor 152 is configured to operate as described in FIGS. 1-3. For example, the processor 152 may be configured to perform one or more steps of method 300 as described in FIG. 3.

Network interface 156 is configured to enable wired and/or wireless communications (e.g., via network 110). The network interface 156 is configured to communicate data between the server 150 and other devices (e.g., scanner 120, computing device 130, and ATM terminals 140), databases, systems, or domains. For example, the network interface 156 may comprise a WIFI interface, a local area network (LAN) interface, a wide area network (WAN) interface, a modem, a switch, or a router. The processor 152 is configured to send and receive data using the network interface 156. The network interface 156 may be configured to use any suitable type of communication protocol as would be appreciated by one of ordinary skill in the art.

Memory 158 may be volatile or non-volatile and may comprise a read-only memory (ROM), random-access memory (RAM), ternary content-addressable memory (TCAM), dynamic random-access memory (DRAM), and static random-access memory (SRAM). Memory 158 may be implemented using one or more disks, tape drives, solid-state drives, and/or the like. Memory 158 is operable to store the software instructions 160, machine learning algorithm 162, document image 106, document 104, noise artifacts 108, training dataset 164, test clean image 184, encoder 210, decoder 216, noise artifact removal module 214, and/or any other data or instructions. The software instructions 160 may comprise any suitable set of instructions, logic, rules, or code operable to execute the processor 152.

Image Noise Reduction Engine

The image noise reduction engine 154 may be implemented by the processor 152 executing software instructions 160, and is generally configured to remove noise artifacts 108 from images 106. Operations of the image noise reduction engine 154 are described in detail in FIG. 1, the operational flow 200 described in FIG. 2, and method 300 described in FIG. 3.

In one embodiment, the image noise reduction engine 154 may be implemented by the machine learning algorithm 162, such as a support vector machine, a neural network, a random forest, a k-means clustering, etc. For example, the image noise reduction engine 154 may be implemented by a plurality of neural network (NN) layers, Convolutional NN (CNN) layers, Long-Short-Term-Memory (LSTM) layers, Bi-directional LSTM layers, Recurrent NN (RNN) layers, and the like.

During a training process, the image noise reduction engine 154 may be trained by a training dataset 164 that includes training clean images 166 associated with the documents 104. For example, a training clean image 166 associated with the document 104 may be prepared by scanning document 104 using a high-resolution scanner 120. In another example, the training clean image 166 associated with the document 104 may be captured by the camera 134. The training dataset 164 further includes training noisy images 172 associated with the documents 104. For example, a training noisy image 172 associated with a document 104 may be prepared by artificially introducing or adding a noise artifact 108 to the training clean image 166.

The image noise reduction engine 154 is fed the training clean image 166 and the training noisy image 172, and is asked to determine a difference between them. The image noise reduction engine 154, by executing the machine learning algorithm 162, extracts features 168 from the training clean image 166. The features 168 may represent shapes, text, numbers, symbols, and any other structure that is displayed on the training clean image 166. The features 186 may be represented by the vector 170 that comprises numerical values.

Similarly, the image noise reduction engine 154 extracts features 174 from the training noisy image 172. The features 174 may represent shapes, text, numbers, symbols, and any other structure that is displayed on the training noisy image 172. The features 174 may be represented by the vector 176 that comprises numerical values.

The image noise reduction engine 154 compares the vector 170 with the vector 176 to determine a difference between the training clean image 166 and the training noisy image 172. For example, in this process, the image noise reduction engine 154 may perform dot (.) product between each number of the vector 170 with a counterpart number of the vector 176.

Based on the comparison, the image noise reduction engine 154 determines which portion(s) of the training clean image 166 differ(s) from the counterpart portion(s) of the training noisy image 172. For example, the image noise reduction engine 154 may compare numbers from the vector 170 representing each portion from the training clean image 166, such as a pixel box with a particular dimension, such as 1×1, 2×2, 1×2, 3×1, 3×3 pixel box with its counterpart numbers from the vector 176. As such, the image noise reduction engine 154 may determine that the difference between the training clean image 166 and the training noisy image 172 is the noise artifact 108 displayed on the training noisy image 172. In this manner, the image noise reduction engine 154 may learn that the difference between the features 168 and features 174 represent the noise artifact 108 on the training noisy image 172.

Figure 2:
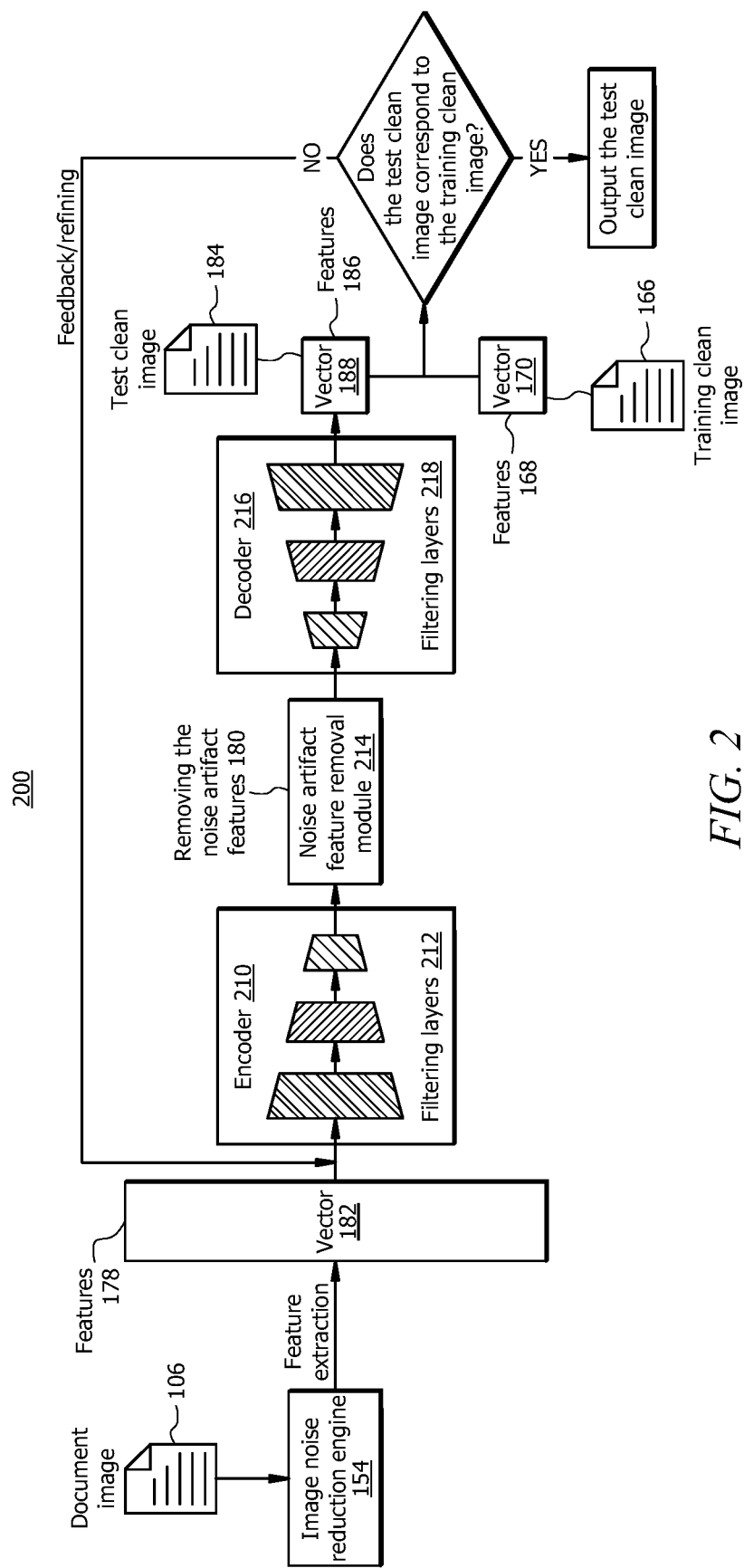
FIG. 2 illustrates an example operational flow of the system of FIG. 1.

Once the image noise reduction engine 154 is trained to identify features that represent the noise artifact 108 on the training noisy image 172, the image noise reduction engine 154 may perform a similar process to identify noise artifact 108 on other document images 106, and remove the features representing the noise artifacts 108 from those document images 106 described in FIG. 2.

Example Operational Flow for Removing Noise Artifacts from an Image

FIG. 2 illustrates an embodiment of an operational flow 200 of the system 100 of FIG. 1. In one embodiment, the operational flow 200 may begin when the image noise reduction engine 154 receives a document image 106.

Referring back to FIG. 1, in one example, the image noise reduction engine 154 may receive the document image 106 from the scanner 120 when the user 102 scans the document 104 at the scanner 120. In another example, the image noise reduction engine 154 may receive the document image 106 from the computing device 130 when the user 102 uses the camera 134 to capture the document image 106 and send the document image 106 to the server 150 using the application 132. In another example, the image noise reduction engine 154 may receive the document image 106 from the ATM 140 when the user 102 inserts the document/check 104 into a slot of the ATM 140. The ATM 140 may capture the document image 106 and send it to the server 150.

Feature Extraction

Referring to FIG. 2, once the image noise reduction engine 154 receives the document image 106, the image noise reduction engine 154, via the machine learning algorithm 162, extracts the features 178 from the document image 106. The features 178 may represent shapes, text, numbers, symbols, and any other structure that is displayed on the document image 106. Since the document image 106 contains a noise artifact 108, the features 178 may include the noise artifact features 180 that represent pixel values of the noise artifact 108. The features 178 may be represented by the vector 182 that comprises numerical values.

The image noise reduction engine 154 feeds the features 178 to the encoder 210. The encoder 210 may be implemented by the processor 152 (see FIG. 1) executing software instructions 160 (see FIG. 1), and is generally configured to reduce the dimension of the vector 182 by compressing the vector 182. In one embodiment, the encoder 210 may comprise a neural network. The encoder 210 may include one or more filtering neural network layers 212 that are configured to reduce the dimension of the vector 182. In the illustrated embodiment, the encoder 210 includes three filtering layers 212. In other embodiments, the encoder 210 may include any number of filtering layers 212. In this manner, the encoder 210 generates the compressed or condensed vector 182. The purpose of reducing the dimension of the vector 182 is to optimize computer processing, memory, and time resources of the server 150. For example, the original vector 182 may comprise hundreds of numerical values which may require a large amount of computer processing, memory, and time resources for processing. By utilizing the encoder 210 and reducing the dimension of the vector 182, the computer processing, memory, and time resources may be utilized more efficiently.

Removing Noise Artifact Features

The image noise reduction engine 154 feeds the condensed vector 182 to a noise artifact features removal module 214. The noise artifact removal module 214 may be implemented by the processor 152 executing software instructions 160, and is generally configured to remove the noise artifact features 180 from the vector 182.

In one embodiment, the noise artifact features removal module 214 may include a neural network dropout layer whose components (e.g., perceptrons) that compute numerical values representing the noise artifact features 180 in the condensed vector 182 are not connected to the decoder 216. In other words, the neural network dropout layer excludes numerical values representing the noise artifact features 180 from being passed on to the output. The noise artifact features removal module 214 identifies particular numerical values representing the noise artifact features 180 from the vector 182, and filters the particular numerical values, such that the particular numerical values are not included in the vector 188.

The decoder 216 may be implemented by the processor 152 (see FIG. 1) executing software instructions 160 (see FIG. 1), and is generally configured to increase the dimension of the condensed vector 182 by uncompressing the condensed vector 182. In one embodiment, the decoder 216 may comprise a neural network. The decoder 216 may include one or more filtering layers 218 that are configured to increase the dimension of the vector 182. In the illustrated embodiment, the decoder 216 includes three filtering layers 218. In other embodiment, the decoder 216 may include any number of filtering layers 218. The output of the decoder is the vector 188. The vector 188 includes numerical values that represent features 186. The features 186 correspond to the features 178 without the noise artifact features 180.

The image noise reduction engine 154 generates the vector 188, such that the dimension of the vector 188 is the same as the dimension of the vector 182 to construct the test clean image 184 with the same dimension as the document image 106. The image noise reduction engine 154 generates the test clean image 184 from the vector 188. For example, the vector 188 may represent pixel values in a one-dimensional array. The image noise reduction engine 154 may arrange the pixel values to form a two-dimensional array that corresponds to the test clean image 184. In other words, the image noise reduction engine 154 reconstructs the test clean image 184 that may have the same image dimension as the document image 106.

Comparing the Test Clean Image with the Training Clean Image

In one embodiment, the image noise reduction engine 154 may compare a portion of the test clean image 184 that previously displayed the noise artifact 108 with a counterpart portion of the training clean image 166 to determine whether the noise artifact 108 is removed from the test clean image 184. The image noise reduction engine 154 may determine whether the portion of the test clean image 184 that previously displayed the noise artifact 108 corresponds to the counterpart portion of the training clean image 166.

In this process, the image noise reduction engine 154 may compare each numerical value of the vector 188 that previously represented a portion of the noise artifact feature 180 with a counterpart numerical value of the vector 170. The image noise reduction engine 154 determines a percentage of the numerical values from the vector 188 that previously represented a portion of the noise artifact feature 180 with a counterpart numerical value of the vector 170. In other words, the image noise reduction engine 154 determines the percentage of the features 186 that represents the portion of the test clean image 184 (that previously represented a portion of the noise artifact feature 180) with a counterpart feature 168. The image noise reduction engine 154 compares the percentage of the features with a threshold percentage (e.g., 80%, 85%, etc.).

In one embodiment, the image noise reduction engine 154 may determine that the portion of the test clean image 184 that previously displayed the noise artifact 108 corresponds to the counterpart portion of the training clean image 166, in response to determining that percentage of the features exceeds the threshold percentage.

In another embodiment, the image noise reduction engine 154 may determine that the portion of the test clean image 184 that previously displayed the noise artifact 108 corresponds to the counterpart portion of the training clean image 166, in response to determining that more than the threshold percentage of the features 186 representing a portion that previously displayed the noise artifact 108 (e.g., 80%, 85%, etc.) are within a threshold range (e.g., ±5%, ±10, etc.) of counterpart features 168.

In one embodiment, the image noise reduction engine 154 may compare the test clean image 184 with the training clean image 166, and perform a similar operation as described above to determine whether the test clean image 184 corresponds to the training clean image 166.

In response to determining that the test clean image 184 corresponds to the training clean image 166, the image noise reduction engine 154 outputs the test clean image 184. Otherwise, the image noise reduction engine 154 may repeat the operational flow 200 in a feedback or refining process. In this manner, the image noise reduction engine 154 may detect and remove noise artifacts 108 from the document image 106.

The image noise reduction engine 154 learns patterns of noise artifacts 108 on a first document image 106, and according to the learning process, detects similar, partially similar, or entirely different noise artifacts 108 from the same document image 106 and/or other document images 106. As such, the image noise reduction engine 154 is configured to use the detected relationship and association between a first noise artifact 108 detected on a first document image 106 and other items on the first document image 106 to detect a second noise artifact 108 on a second document image 106, where the relationship and association between the second noise artifact 108 and other items displayed on the second document image 106 may correspond to (or within a threshold range from) the relationship and association between the first noise artifact 108 and the other item on the first document image 106. For example, the association and relationship between a noise artifact 108 and its corresponding document image 106 are determined based on differences between a first set of numerical values in a vector 182 representing the noise artifact features 180 and a second set of numerical values in the vector 182 representing the other items on the corresponding document image 106.

For example, assume that the image noise reduction engine 154 is fed a first document image 106 on which a first noise artifact 108 (e.g., a first logo) is displayed, e.g., on the center of the first document image 106. The image noise reduction engine 154 learns a pattern, shape, orientation, and structure of the first noise artifact 108 (e.g., a first logo) by extracting features 178, and comparing the features 178 with features 168 associated with the training clean image 166. The image noise reduction engine 154 also determines the relationships between the first noise artifact 108 and the rest of the first document image 106.

For example, the image noise reduction engine 154 may determine the differences between the shape, font size, orientation, and location of the first noise artifact 108 with, respectively, the shape, font size, orientation, and location of other items on the first document image 106. The image noise reduction engine 154 uses this information to detect the same or any other first noise artifact 108 (e.g, logo, shape, etc.) that has the same relationship or association with the rest of the items displayed on other document images 106. For example, the image noise reduction engine 154 determines the difference between a first set of numerical values in the vector 182 that represent the first noise artifact 108 with a second set of numerical values in the vector 182 representing the rest of the items displayed on other document images 106.

For example, assume that the image noise reduction engine 154 is fed a second document image 106 that contains a second noise artifact 108 (e.g., a second logo) that is different from the first noise artifact 108 (e.g., the first logo), e.g., on a corner side. Also, assume that the second noise artifact 108 has a different orientation, location, and/or font size compared to the first noise artifact 108. The image noise reduction engine 154 determines the relationship and association between the shape, font size, orientation, and location of the second noise artifact 108 with, respectively, the shape, font size, orientation, and location of other items on the second document image 106. For example, the image noise reduction engine 154 determines the difference between a first set of numerical values in the vector 182 that represent the second noise artifact 108 with a second set of numerical values in the vector 182 representing the rest of the items displayed on the second document images 106.

If the image noise reduction engine 154 determines that these differences are within a threshold range (e.g., ±5%, ±10%, etc.), the image noise reduction engine 154 determines that the second logo corresponds to the second noise artifact 108, and adjusts the weight and bias values of the encoder 210, noise artifact feature removal module 214, and the decoder 216, such that the noise artifact features 180 are removed from the vector 182. The image noise reduction engine 154 may implement a similar process to detecting patterns, shapes, sizes, and orientations of any other noise artifact 108.

Example Method for Removing Noise Artifacts from an Image

Figure 3:
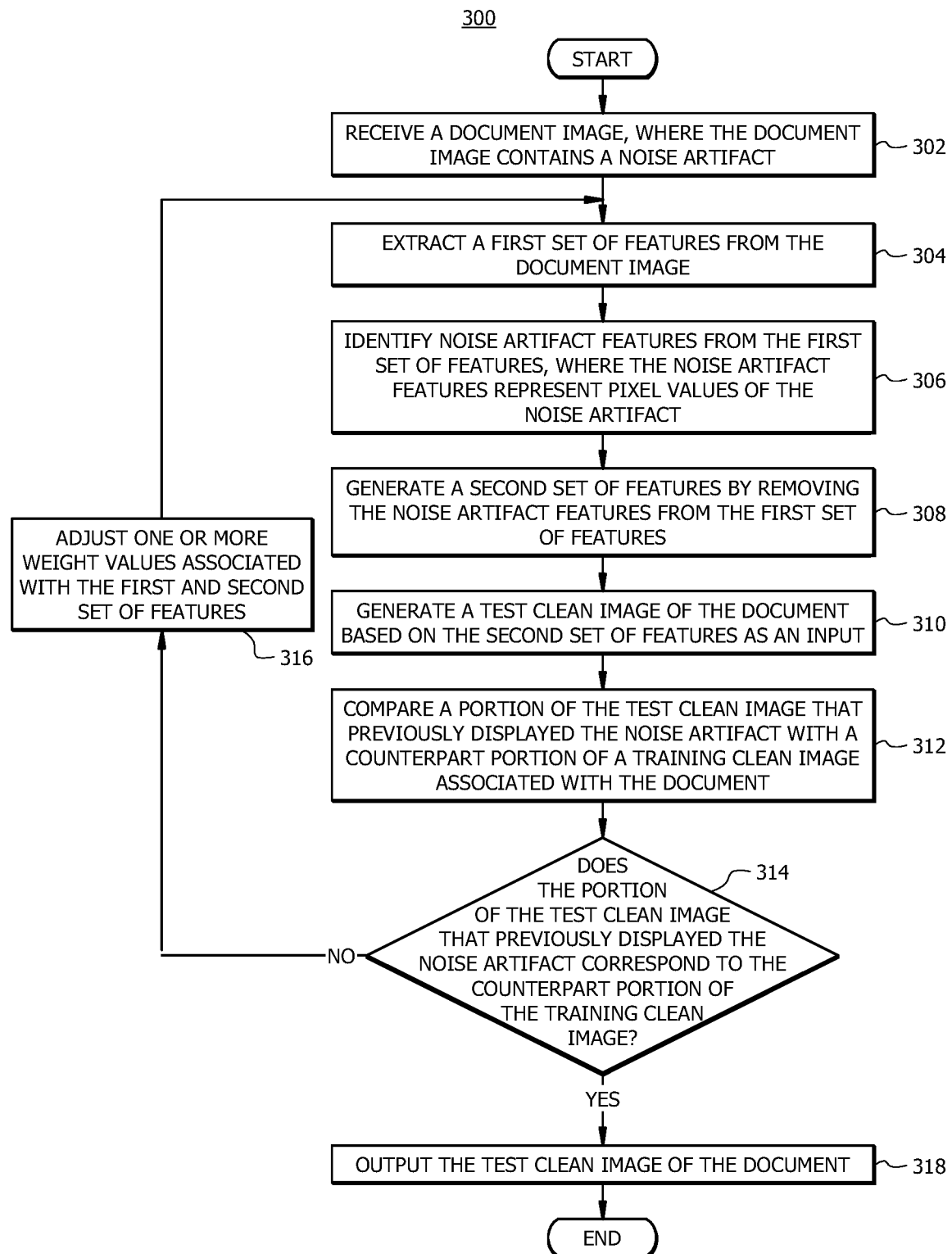
FIG. 3 illustrates an example flowchart of a method for removing noise artifacts from images.

FIG. 3 illustrates an example flowchart of a method 300 for removing noise artifacts from a document image 106. Modifications, additions, or omissions may be made to method 300. Method 300 may include more, fewer, or other steps. For example, steps may be performed in parallel or in any suitable order. While at times discussed as the system 100, processor 152, image noise reduction engine 154, or components of any of thereof performing steps, any suitable system or components of the system may perform one or more steps of the method 300. For example, one or more steps of method 300 may be implemented, at least in part, in the form of software instructions 160 of FIG. 1, stored on non-transitory, tangible, machine-readable media (e.g., memory 158 of FIG. 1) that when run by one or more processors (e.g., processor 152 of FIG. 1) may cause the one or more processors to perform steps 302-318.

Method 300 begins at step 302 where the image noise reduction engine 154 receives a document image 106, where the document image 106 contains a noise artifact 108. For example, the image noise reduction engine 154 may receive the document image 106 from the scanner 120, the computing device 130, or the ATM 140, similar to that described in FIGS. 1 and 2. The document image 106 may be an image of the document 10 that may display text, forms, tables, numbers, symbols, shapes, logos, etc. The noise artifact 108 may include any noise particle that at least partially obstructs a portion of the document image 106, including logo shapes, letters, numbers, symbols, and background dots.

At step 304, the image noise reduction engine 154 extracts a first set of features 178 from the document image 106, where the first set of features 178 represents shapes, symbols, numbers, text, or any other element that is displayed on the document image 106. For example, the image noise reduction engine 154 may feed the document image 106 to the machine learning algorithm 162 to extract the first set of features 178, and thus, generate the vector 182, similar to that described in FIG. 1 and the operational flow 200 described in FIG. 2.

At step 306, the image noise reduction engine 154 identifies noise artifact features 180 from the first set of features 178, where the noise artifact features 180 represent pixel values of the noise artifact 108. For example, the image noise reduction engine 154 feeds the vector 182 to the encoder 210 to identify the noise artifact features 180, similar to that described in FIG. 1 and the operational flow 200 described in FIG. 2.

At step 308, the image noise reduction engine 154 generates a second set of features 186 by removing the noise artifact features 180 from the first set of features 178. In this process, the image noise reduction engine 154 may feed the vector 182 to the noise artifact feature removal module 214. The noise artifact feature removal module 214 may include a neural network dropout layer that excludes numerical values representing the noise artifact features 180 from being passed on or connected to the decoder 216, similar to that described in the operational flow 200 described in FIG. 2.

At step 310, the image noise reduction engine 154 generates a test clean image 184 based on the second set of features 186 as in input. For example, the image noise reduction engine 154 arranges numerical values from the vector 188 that may be represented in a one-dimensional array to a two-dimensional array that corresponds to the test clean image 184. In other words, the image noise reduction engine 154 reconstructs the test clean image 184 that may have the same image dimension as the document image 106. The image noise reduction engine 154 may generate the test clean image 184 in any other suitable image dimension, e.g., half of the dimension of the document image 106, double the dimension of the document image 106, etc.

At step 312, the image noise reduction engine 154 compares a portion of the test clean image 184 that previously displayed the noise artifact 108 with a counterpart portion of a training clean image 166 associated with the document 104. In this process, the image noise reduction engine 154 may compare each numerical value of the vector 188 that previously represented a portion of the noise artifact feature 180 with a counterpart numerical value of the vector 170. The image noise reduction engine 154 determines a percentage of the numerical values from the vector 188 that previously represented a portion of the noise artifact feature 180 with a counterpart numerical value of the vector 170. In other words, the image noise reduction engine 154 determines the percentage of the features 186 that represent the portion of the test clean image 184 (that previously represented a portion of the noise artifact feature 180) with a counterpart feature 168. The image noise reduction engine 154 compares the percentage of the features with a threshold percentage (e.g., 80%, 85%, etc.). In one embodiment, the image noise reduction engine 154 may determine that the portion of the test clean image 184 that previously displayed the noise artifact 108 corresponds to the counterpart portion of the training clean image 166, in response to determining that percentage of the features exceeds the threshold percentage. If the image noise reduction engine 154 determines that the portion of the test clean image 184 that previously displayed the noise artifact 108 corresponds to the counterpart portion of the training clean image 166, method 300 proceeds to step 318. Otherwise, method 300 proceeds to step 316.

At step 316, the image noise reduction engine 154 adjusts one or more weight values associated with the first and second set of features 178 and 186. For example, the image noise reduction engine 154 may adjust one or more weight and/or bias values associated with numerical values of the vectors 182 and/or 188. Once the image noise reduction engine 154 adjusts the one or more weight and bias values, method 300 may return to step 304. For example, the image noise reduction engine 154 may repeat the operational flow 200 described in FIG. 2 until the portion of the test clean image 184 that previously displayed the noise artifact 108 corresponds to the counterpart portion of the training clean image 166 more than a threshold percentage (e.g., more than 80%, 85%, etc.).

At step 318, the image noise reduction engine 154 outputs the test clean image 184 of the document 104. In one embodiment, the image noise reduction engine 154 may be executed by a processor resident in the scanner 120. As such, method 300 may be performed by the scanner 120.

Example Edge Device for Detecting and Removing Noise Artifacts from Documents

Figure 4:
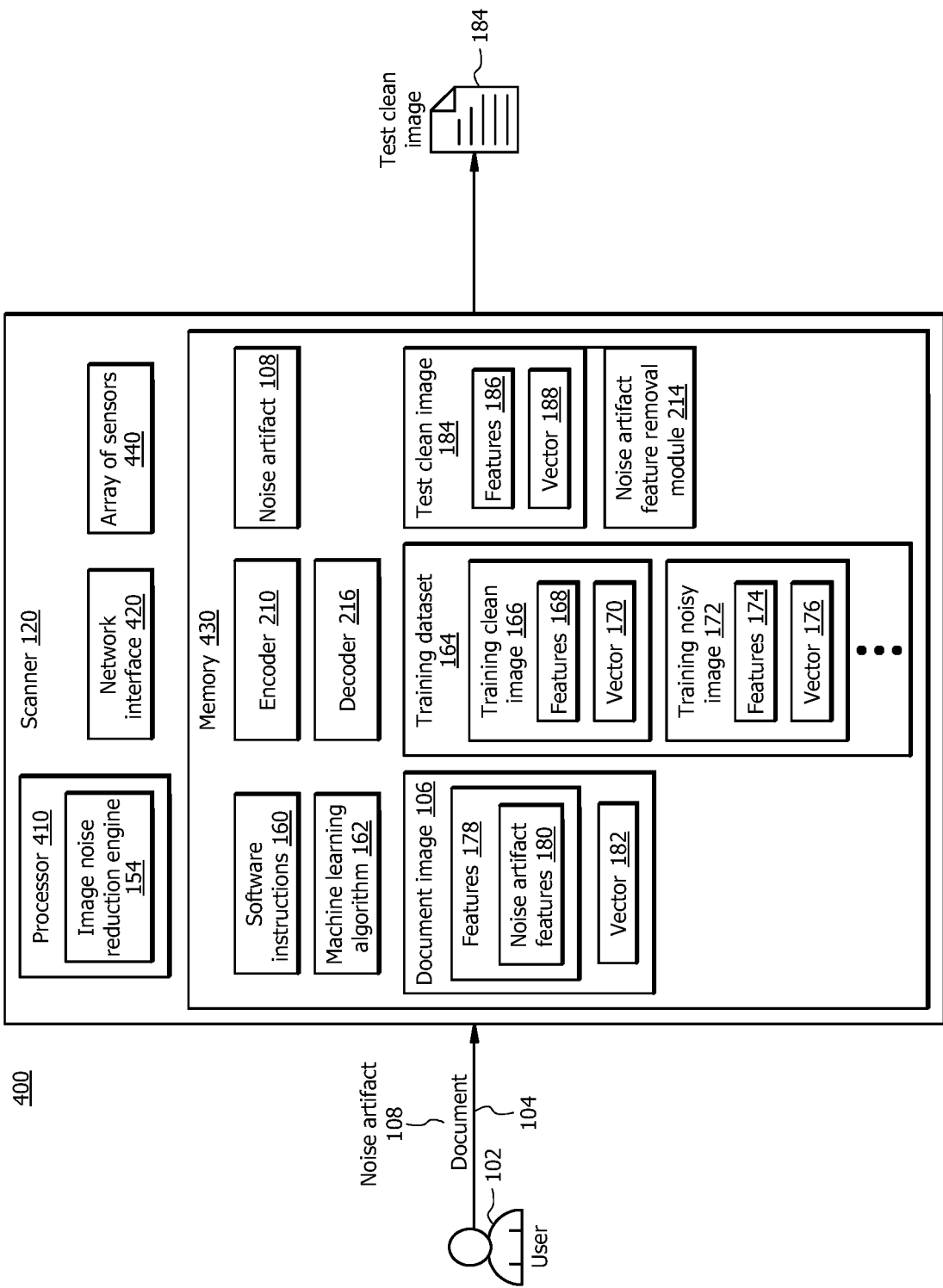
FIG. 4 illustrates an embodiment of an edge device configured for detecting and removing noise artifacts from documents.

FIG. 4 illustrates one embodiment of an edge device 400 that is configured to detect and remove noise artifacts 108 from documents 104. In one embodiment, edge device 400 comprises a scanner 120. The scanner 120 may be similar to scanner 120 described in FIG. 1. The scanner 120 comprises a processor 410 in signal communication with a memory 430. Memory 430 stores software instructions 160 that when executed by the processor 410 cause the processor 410 to perform one or more functions described herein. For example, when the software instructions 160 are executed, the processor 410 executes the image noise reduction engine 154 to detect and remove noise artifacts 108 from documents 104. In other embodiments, edge device 400 may not have all of the components listed and/or may have other elements instead of, or in addition to, those listed above.

System Components

In the illustrated embodiment, the scanner 120 comprises the processor 410, network interface 420, memory 430, and an array of sensors 440. The scanner 120 may be configured as shown or in any other configuration.

Processor 410 comprises one or more processors operably coupled to the memory 430. The processor 410 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 410 may be a programmable logic device, a microcontroller, a microprocessor, or any suitable combination of the preceding. The one or more processors are configured to process data and may be implemented in hardware or software. For example, the processor 410 may be 8-bit, 16-bit, 32-bit, 64-bit, or of any other suitable architecture. The processor 410 may include an arithmetic logic unit (ALU) for performing arithmetic and logic operations, processor 410 registers the supply operands to the ALU and stores the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 160) to implement the image noise reduction engine 154. In this way, processor 410 may be a special-purpose computer designed to implement the functions disclosed herein. In an embodiment, the processor 410 is implemented using logic units, FPGAs, ASICs, DSPs, or any other suitable hardware. The processor 410 is configured to operate as described in FIGS. 4-5. For example, the processor 410 may be configured to perform one or more steps of method 500 as described in FIG. 5.

Network interface 420 is configured to enable wired and/or wireless communications (e.g., via network 110 of FIG. 1). The network interface 420 is configured to communicate data between the scanner 120 and other devices (e.g., computing devices 130, ATM terminals 140, and servers 150 of FIG. 1), databases, systems, or domains. For example, the network interface 420 may comprise a WIFI interface, a local area network (LAN) interface, a wide area network (WAN) interface, a modem, a switch, or a router. The processor 410 is configured to send and receive data using the network interface 420. The network interface 420 may be configured to use any suitable type of communication protocol as would be appreciated by one of ordinary skill in the art.

Memory 430 may be volatile or non-volatile and may comprise a read-only memory (ROM), random-access memory (RAM), ternary content-addressable memory (TCAM), dynamic random-access memory (DRAM), and static random-access memory (SRAM). Memory 430 may be implemented using one or more disks, tape drives, solid-state drives, and/or the like. Memory 430 is operable to store the software instructions 160, machine learning algorithm 162, document image 106, document 104, noise artifacts 108, training dataset 164, test clean image 184, encoder 210, decoder 216, noise artifact removal module 214, and/or any other data or instructions. The software instructions 160 may comprise any suitable set of instructions, logic, rules, or code operable to execute the processor 410.

Array of sensors 440 may include Charge-Coupled Diode (CCD) array and/or complementary metal-oxide-semiconductor (CMOS) sensor array that are configured to scan a document 104, when the document 104 is facing the array of sensors 440. For example, the array of sensors 440 may capture a scan of the document 104 when the document is placed underneath a lid of the scanner 120, facing the array of sensors 440 and the lid is closed.

Operational Flow

The operational flow of edge device 400 begins when the scanner 120 receives a scan of the document 104. For example, the scanner 120 may receive the scan of the document 104 from the array of sensors 44, when the user 102 uses the scanner 120 to scan and/or print the document 104. The document 104 may contain a noise artifact 108 that at least partially obstructs a portion of the document 104. Upon receipt of the scan of the document 104, the processor 410 generates an image of the document 104 (i.e., document image 106). In one embodiment, the scanner 120 may use the array of sensors 440 to scan the document 104. The processor 410 may implement an Object Character Recognition (OCR) algorithm to scan the document 104 and generate the document image 106.

Once the document image 106 is generated, the image noise reduction engine 154 performs the process of noise artifact feature removal from the document image 106, similar to that described in the operational flow 200 described in FIG. 2. For example, the image noise reduction engine 154 may feed the document image 106 to the machine learning algorithm 162 to: 1) extract features 178 from the document image 106; 2) identify noise artifact features 180 from the features 178; 3) generate features 186 by removing the noise artifact features 180 from the features 178; and 4) generate a test clean image 184 based on the features 186 as an input.

The image noise reduction engine 154 compares the portion of the test clean image 184 that previously displayed the noise artifact 108 with a counterpart portion of a training clean image 166 (e.g., from the training dataset 164, and associated with another document 104 and training noisy image 172 with the same or different noise artifact 108 compared to the noise artifact 108 associated with the document 104) to determine whether the noise artifact 108 is removed from the test clean image 184, similar to that described in FIGS. 1 and 2.

The image noise reduction engine 154 determines whether the portion of the test clean image 184 that previously displayed the noise artifact corresponds to the counterpart portion of the training clean image 166. In response to determining that the portion of the test clean image 184 that previously displayed the noise artifact corresponds to the counterpart portion of the training clean image 166, the image noise reduction engine 154 outputs the test clean image 184. Thus, the scanner 120 may output the test clean image 184. In one embodiment, the scanner 120 may further print a second document using the test clean image 184 if the user 102 interacting with the scanner 120, selects a "print" option on a user interface of the scanner 120.

Figure 5:
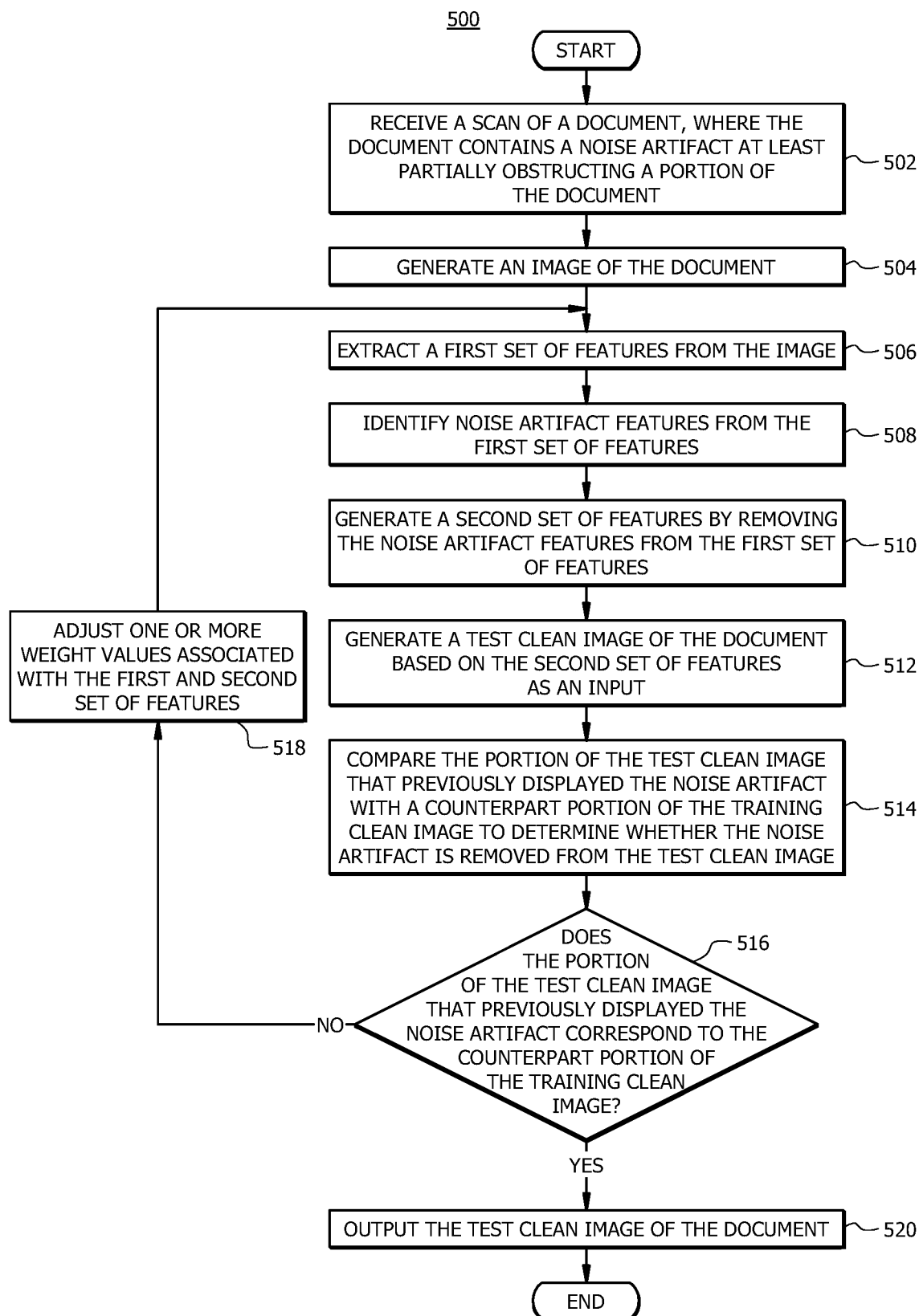
FIG. 5 illustrates an example flowchart of a method for detecting and removing noise artifacts from documents.

Example Method for Detecting and Remove Noise Artifacts from Documents at a Scanner FIG. 5 illustrates an example flowchart of a method 500 for removing noise artifacts from a document 104. Modifications, additions, or omissions may be made to method 500. Method 500 may include more, fewer, or other steps. For example, steps may be performed in parallel or in any suitable order. While at times discussed as the edge device 400, processor 410, image noise reduction engine 154, scanner 120, or components of any of thereof performing steps, any suitable system or components of the system may perform one or more steps of the method 300. For example, one or more steps of method 500 may be implemented, at least in part, in the form of software instructions 160 of FIG. 4, stored on non-transitory, tangible, machine-readable media (e.g., memory 430 of FIG. 4) that when run by one or more processors (e.g., processor 410 of FIG. 4) may cause the one or more processors to perform steps 502-520.

Method 500 begins at step 502 when the image noise reduction engine 154 receives a scan of a document 104, where the document 104 contains a noise artifact 108 at least partially obstructing a portion of the document 104. For example, the image noise reduction engine 154 may receive the scan of the document 104 when the user 102 uses the scanner 120 to scan and/or print the document 104.

At step 504, the image noise reduction engine 154 generates an image of the document 104 (i.e., document image 106). For example, the image noise reduction engine 154 may implement an OCR algorithm to generate the document image 106, similar to that described in FIG. 4. The image noise reduction engine 154 may perform the operational flow 200 described in FIG. 2 to remove the noise artifact 108 from the document image 106. To this end, the image noise reduction engine 154 may perform steps 506 to 520, as described below.

At step 506, the image noise reduction engine 154 extracts a first set of features 178 from the document image 106. For example, the image noise reduction engine 154 may feed the document image 106 to the machine learning algorithm 162 to extract the first set of features 178. The first set of features 178 may represent shapes, symbols, numbers, text, and/or any other item that is displayed on the document image 106.

At step 508, the image noise reduction engine 154 identifies noise artifact features 180 from the first set of features 178. For example, the image noise reduction engine 154 may feed the vector 182 that represents the features 178 to the encoder 210 to identify the noise artifact features 180, similar to that described in FIG. 2.

At step 510, the image noise reduction engine 154 generates a second set of features 186 by removing the noise artifacts 180 from the first set of features 178. For example, the image noise reduction engine 154 may generate the second set of features 186 by feeding the vector 182 to the noise artifact feature removal module 214 and the decoder 216, similar to that described in FIG. 2.

At step 512, the image noise reduction engine 154 generates a test clean image 184 based on the second set of features 186 as an input. For example, the image noise reduction engine 154 may feed the vector 182 to the decoder 216 to generate the test clean image 184, similar to that described in FIG. 2.

At step 514, the image noise reduction engine 154 compares the portion of the test clean image 184 that previously displayed the noise artifact 108 with a counterpart portion of a training clean image 166 associated with the document 104 to determine whether the noise artifact 108 is removed from the test clean image 184. For example, the image noise reduction engine 154 compares numerical values from the vector 188 that previously represented the noise artifact features 180 with counterpart numerical values from the vector 188, similar to that described in FIG. 2.

At step 516, the image noise reduction engine 154 determines whether the portion of the test clean image 184 that previously displayed the noise artifact corresponds to the counterpart portion of the training clean image 166. If the image noise reduction engine 154 determines that the portion of the test clean image 184 that previously displayed the noise artifact corresponds to the counterpart portion of the training clean image 166, method 500 proceeds to step 520. Otherwise, method 500 proceeds to step 518.

At step 518, the image noise reduction engine 154 adjusts one or more weight values associated with the first and second set of features 178 and 186. For example, the image noise reduction engine 154 may adjust one or more weight and/or bias values associated with numerical values of the vectors 182 and/or 188. Once the image noise reduction engine 154 adjusts the one or more weight and bias values, method 500 may return to step 506. For example, the image noise reduction engine 154 may repeat the operational flow 200 described in FIG. 2 until the portion of the test clean image 184 that previously displayed the noise artifact 108 corresponds to the counterpart portion of the training clean image 166 more than a threshold percentage (e.g., more than 80%, 85%, etc.).

At step 520, the image noise reduction engine 154 outputs the test clean image 184 of the document 104. For example, the processor 410 may save the test clean image 184 in the memory 430 and/or print the test clean image 184.

Figure 6:
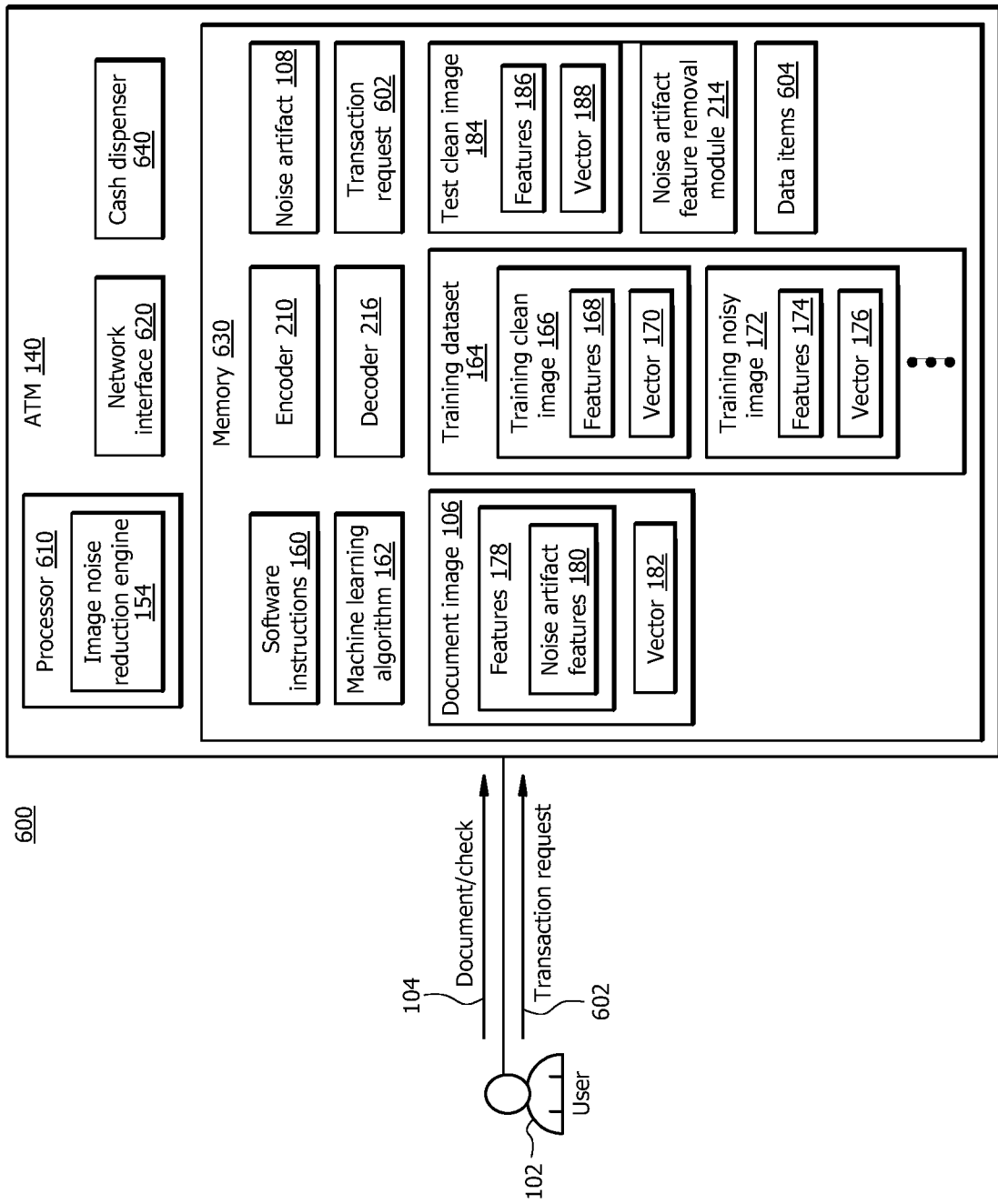
FIG. 6 illustrates an embodiment of an ATM configured for detecting and removing security vulnerabilities by removing noise artifacts from documents.

Example System for Detecting and Removing Security Vulnerabilities by Removing Noise Artifacts from Documents FIG. 6 illustrates one embodiment of a system 600 that is configured to detect and remove security vulnerabilities as a consequence of noise artifacts 108 in documents 104, such as checks, gift cards, travel checks, and/or the like. In one embodiment, system 600 comprises an ATM 140. The ATM 140 may be similar to ATM 140 described in FIG. 1. The ATM 140 comprises a processor 610 in signal communication with a memory 630. Memory 630 stores software instructions 160 that when executed by the processor 610 cause the processor 610 to perform one or more functions described herein. For example, when the software instructions 160 are executed, the processor 610 executes the image noise reduction engine 154 to detect and remove noise artifacts 108 from documents 104 that may have caused security vulnerabilities, such as signature mismatching, account number mismatching, etc., in checks. In other embodiments, system 600 may not have all of the components listed and/or may have other elements instead of, or in addition to, those listed above.

System Components

In the illustrated embodiment, the ATM 140 comprises the processor 610, network interface 620, memory 630, and cash dispenser 640. The ATM 140 may be configured as shown or in any other configuration.

Processor 610 comprises one or more processors operably coupled to the memory 630. The processor 610 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 610 may be a programmable logic device, a microcontroller, a microprocessor, or any suitable combination of the preceding. The one or more processors are configured to process data and may be implemented in hardware or software. For example, the processor 610 may be 8-bit, 16-bit, 32-bit, 64-bit, or of any other suitable architecture. The processor 610 may include an arithmetic logic unit (ALU) for performing arithmetic and logic operations, processor 610 registers the supply operands to the ALU and stores the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 160) to implement the image noise reduction engine 154. In this way, processor 610 may be a special-purpose computer designed to implement the functions disclosed herein. In an embodiment, the processor 610 is implemented using logic units, FPGAs, ASICs, DSPs, or any other suitable hardware. The processor 610 is configured to operate as described in FIGS. 6-7. For example, the processor 610 may be configured to perform one or more steps of method 700 as described in FIG. 7.

Network interface 620 is configured to enable wired and/or wireless communications (e.g., via network 110 of FIG. 1). The network interface 620 is configured to communicate data between the ATM 140 and other devices (e.g., scanners 120, computing devices 130, and servers 150 of FIG. 1), databases, systems, or domains. For example, the network interface 620 may comprise a WIFI interface, a local area network (LAN) interface, a wide area network (WAN) interface, a modem, a switch, or a router. The processor 610 is configured to send and receive data using the network interface 620. The network interface 620 may be configured to use any suitable type of communication protocol as would be appreciated by one of ordinary skill in the art.

Memory 630 may be volatile or non-volatile and may comprise a read-only memory (ROM), random-access memory (RAM), ternary content-addressable memory (TCAM), dynamic random-access memory (DRAM), and static random-access memory (SRAM). Memory 630 may be implemented using one or more disks, tape drives, solid-state drives, and/or the like. Memory 630 is operable to store the software instructions 160, machine learning algorithm 162, document image 106, document 104, noise artifacts 108, training dataset 164, test clean image 184, encoder 210, decoder 216, noise artifact removal module 214, transaction request 602, and/or any other data or instructions. The software instructions 160 may comprise any suitable set of instructions, logic, rules, or code operable to execute the processor 610.

Operational Flow

The operational flow of system 600 begins when the ATM 140 receives a transaction request 602. The ATM 140 may receive the transaction request 602 when a document 104 is inserted into a slot of the ATM 140. The transaction request 602 may comprise a request to deposit an amount associated with the document 104 into a user account associated with the user 102. The document 104, for example, may include a check. Thus, in an example where the document 104 includes a check, the document 104 may include data items 604 such as a sender's name, a receiver's name, an amount, a sender's signature, an amount, a sender's account number, a receiver's account number, among other data items 604 associated with the document 104. The document 104 may contain a noise artifact 108 that at least partially obstructs a portion of the document 104.

Upon receiving the document 104, the processor 610 generates an image of the document 104 (i.e., document image 106) by scanning the document 104. For example the processor 610 may implement an OCR algorithm to scan the document 104 and generate the document image 106. The document image 106 may display the information associated with the document 104, including those listed above.

The image noise reduction engine 154 may determine whether the noise artifact 108 at least partially obstructs one or more data item 604 displayed on the document image 106, such as the sender's name, receiver's name, amount, sender's signature, amount, sender's account number, receiver's account number, etc. In response to determining that the noise artifact 108 at least partially obstructs the one or more of the items displayed on the document image 106, the image noise reduction engine 154 may perform the process of noise artifact feature removal from the document image 106, similar to that described in the operational flow 200 described in FIG. 2. By performing the process described in the operational flow 200, the image noise reduction engine 154, generates a test clean image 184 associated with the document 104 by removing the noise artifact 108 from the image document image 106.

The image noise reduction engine 154 compares a portion of the test clean image 184 that previously displayed the noise artifact 108 with a counterpart portion of a training clean image 166 (e.g., from the training dataset 164, and associated with another document 104 and training noisy image 172 with the same or different noise artifact 108 compared to the noise artifact 108 associated with the document 104) to determine whether the noise artifact 108 is removed from the test clean image 184, similar to that described in FIGS. 1 and 2.

The image noise reduction engine 154 determines whether the portion of the test clean image 184 that previously displayed the noise artifact 108 corresponds to the counterpart portion of the training clean image 166. In response to determining that the portion of the test clean image 184 that previously displayed the noise artifact 108 corresponds to the counterpart portion of the training clean image 166, the image noise reduction engine 154 determines that the noise artifact 108 is removed from the test clean image 184.

In this manner, the image noise reduction engine 154 detects and removes potential security vulnerabilities that have been caused as a consequence of the noise artifact 108 on the document 104, such as sender's signature mismatching, sender's name mismatching, account number mismatching, receiver's name mismatching, amount mismatching, serial number mismatching, etc.

The processor 610 may determine whether the document 104 (e.g., the check) is valid. For example, during a training process, the processor 610 may determine that the document 104 is valid by comparing the information displayed on the test clean image 184 with their counterpart information displayed on the training clean image 166.

In another example, the processor 610 may determine that the document 104 is valid by comparing the information displayed on the test clean image 184 with information associated with the document 104 stored in a database, such as the sender's name, receiver's name, amount, sender's signature, amount, sender's account number, receiver's account number, etc. In this process, the processor 610 determines whether the document 104 (e.g., the check) is valid by determining whether the check has already been deposited or not. The processor 610 may obtain this information from the database. If the processor 610 determines that the check has not been deposited yet, the processor 610 approves the transaction request 602.

The processor 610 may approve the transaction request 602 by depositing the amount associated with the check into the account of the user 102 or dispensing cash equal to the amount of the check from the cash dispenser 640 depending on which option the user 102 selects on user interface of the ATM 140.

Figure 7:
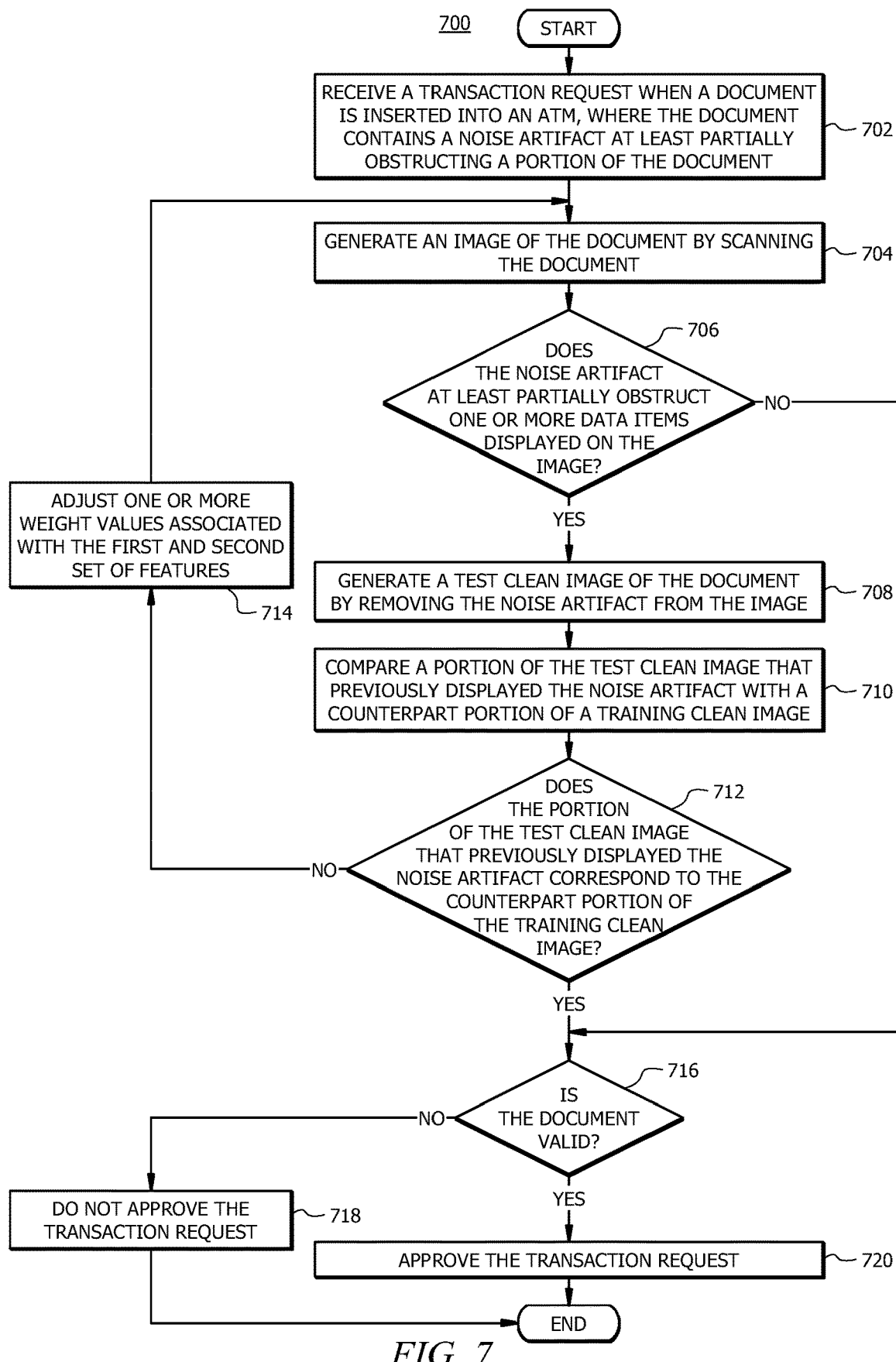
FIG. 7 illustrates an example flowchart of a method for detecting and removing security vulnerabilities by removing noise artifacts from documents.

Example Method for Detecting and Removing Security Vulnerabilities by Removing Noise Artifacts from Documents FIG. 7 illustrates an example flowchart of a method 700 for detecting and removing security vulnerabilities as a consequence of noise artifacts 108 in a document 104.

Modifications, additions, or omissions may be made to method 700. Method 700 may include more, fewer, or other steps. For example, steps may be performed in parallel or in any suitable order. While at times discussed as the system 600, processor 610, image noise reduction engine 154, ATM 140, or components of any of thereof performing steps, any suitable system or components of the system may perform one or more steps of the method 700. For example, one or more steps of method 700 may be implemented, at least in part, in the form of software instructions 160 of FIG. 6, stored on non-transitory, tangible, machine-readable media (e.g., memory 630 of FIG. 6) that when run by one or more processors (e.g., processor 610 of FIG. 6) may cause the one or more processors to perform steps 702-720.

Method 700 begins at step 702 where the ATM 140 receives a transaction request 602 when a document 104 is inserted into the ATM 140, where the document 104 contains a noise artifact 108 at least partially obstructing a portion of the document 104. The document 104 may include a check. The transaction request 602 may comprise a request to deposit an amount associated with the document 104 into a user account of the user 102.

At step 704, the image noise reduction engine 154 generates an image of the document 104 (i.e., document image 106) by scanning the document 104. For example, the image noise reduction engine 154 may implement an OCR algorithm to scan the document 104 and generate the document image 106, similar to that described in FIG. 6.

At step 706, the image noise reduction engine 154 determines whether the noise artifact 108 at least partially obstructs one or more data items 604 displayed on the document image 106. For example, the image noise reduction engine 154 may determine whether the noise artifact 108 at least partially obstructs one or more of the sender's name, receiver's name, amount, sender's signature, amount, sender's account number, receiver's account number, etc. If the image noise reduction engine 154 determines that the noise artifact 108 at least partially obstructs one or more of the sender's name, receiver's name, amount, sender's signature, amount, sender's account number, receiver's account number, etc., method 700 proceeds to step 708. Otherwise, method 700 proceeds to step 716.

At step 708, the image noise reduction engine 154 generates a test clean image 184 of the document 104 by removing the noise artifact 108 from the document image 106. For example, the image noise reduction engine 154 may feed the document image 106 to the machine learning algorithm 162, and perform the process similar to that described above in conjunction with the operational flow 200 described in FIG. 2.

At step 710, the image noise reduction engine 154 compares a portion of the test clean image 184 that previously displayed the noise artifact 108 with a counterpart portion of a training clean image 166. For example, the training clean image 166 may include an image of a check that is free of noise artifacts 108.

At step 712, the image noise reduction engine 154 determines whether the portion of the test clean image 184 that previously displayed the noise artifact 108 corresponds to the counterpart portion of the training clean image 166, similar to that described in FIGS. 1 and 2.

At step 714, the image noise reduction engine 154 adjusts one or more weight values associated with the first and second set of features 178 and 186. For example, the image noise reduction engine 154 may adjust one or more weight and/or bias values associated with numerical values of the vectors 182 and/or 188. Once the image noise reduction engine 154 adjusts the one or more weight and bias values, method 700 may return to step 704. For example, the image noise reduction engine 154 may repeat the operational flow 200 described in FIG. 2 until the portion of the test clean image 184 that previously displayed the noise artifact 108 corresponds to the counterpart portion of the training clean image 166 more than a threshold percentage (e.g., more than 80%, 85%, etc.).

At step 716, the processor 610 determines whether the document 104 (e.g., the check) is valid. For example, the processor 610 may determine that the document 104 is valid by comparing the information extracted from the test clean image 184 with information associated with the document 104 stored in a database, such as the sender's name, receiver's name, amount, sender's signature, amount, sender's account number, receiver's account number, etc. In this process, the processor 610 determines whether the document 104 (e.g., the check) is valid by determining whether the check has already been deposited or not. If the processor 610 determines that the document 104 is valid, method 700 proceeds to step 720. Otherwise, method 700 proceeds to step 718.

At step 718, the processor 610 does not approve the transaction request 602.

At step 720, the processor 610 approves the transaction request 602.

Figure 8:
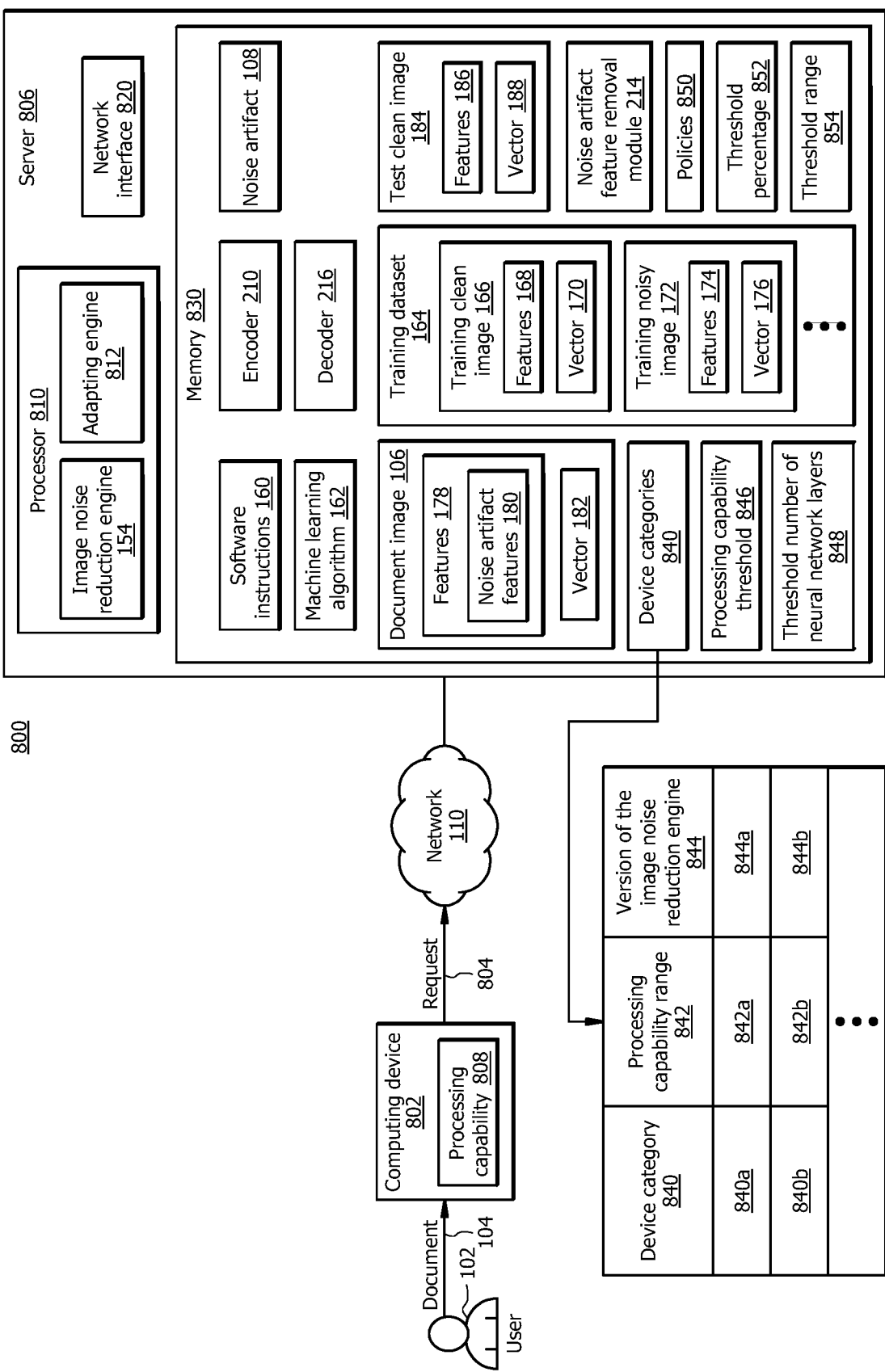
FIG. 8 illustrates an embodiment of a system configured for adapting an image noise removal model based on a device's processing capability.

Example System for Adapting an Image Noise Removal Model Based on a Device's Processing Capability FIG. 8 illustrates one embodiment of a system 800 that is configured to adapt the image noise reduction engine 154 based on processing capability 808 associated with a computing device 802. In one embodiment, system 800 comprises a server 806. In some embodiments, system 800 further comprises a computing device 802 and network 110. The computing device 802 may be similar to the computing device 130, scanner 120, and/or the ATM 140 described in FIG. 1. The server 806 may be similar to the server 150 described in FIG. 1. The network 110 enables communication between the components of the system 800. The server 806 comprises a processor 810 in signal communication with a memory 830. Memory 830 stores software instructions 160 that when executed by the processor 810 cause the processor 810 to perform one or more functions described herein. For example, when the software instructions 160 are executed, the processor 810 executed the image noise reduction engine 154 and/or adapting engine 812. Generally, the image noise reduction engine 154 is configured to detect and remove noise artifacts 108 from document images 106, similar to that described in FIGS. 1 and 2. The adapting engine 812 is implemented by the processor 810 executing the software instructions 160, and is generally configured to adapt the image noise reduction engine 154 (interchangeably referred to herein as image noise removal module) to be deployed to a computing device 802 based on the processing capability 808 associated with the computing device 802. In other embodiments, system 800 may not have all of the components listed and/or may have other elements instead of, or in addition to, those listed above.

System Components

In the illustrated embodiment, server 806 comprises the processor 810, network interface 820, and memory 830. The server 806 may be configured as shown or any other configuration.

Processor 810 comprises one or more processors operably coupled to the memory 830. The processor 810 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 810 may be a programmable logic device, a microcontroller, a microprocessor, or any suitable combination of the preceding. The one or more processors are configured to process data and may be implemented in hardware or software. For example, the processor 810 may be 8-bit, 16-bit, 32-bit, 64-bit, or of any other suitable architecture. The processor 810 may include an arithmetic logic unit (ALU) for performing arithmetic and logic operations, processor 810 registers the supply operands to the ALU and stores the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 160) to implement the image noise reduction engine 154 and adapting engine 812. In this way, processor 810 may be a special-purpose computer designed to implement the functions disclosed herein. In an embodiment, the processor 810 is implemented using logic units, FPGAs, ASICs, DSPs, or any other suitable hardware. The processor 810 is configured to operate as described in FIGS. 8-9. For example, the processor 810 may be configured to perform one or more steps of method 900 as described in FIG. 9.

Network interface 820 is configured to enable wired and/or wireless communications (e.g., via network 110 of FIG. 1). The network interface 820 is configured to communicate data between the server 806 and other devices (e.g., computing devices 802), databases, systems, or domains. For example, the network interface 820 may comprise a WIFI interface, a local area network (LAN) interface, a wide area network (WAN) interface, a modem, a switch, or a router. The processor 810 is configured to send and receive data using the network interface 820. The network interface 820 may be configured to use any suitable type of communication protocol as would be appreciated by one of ordinary skill in the art.

Memory 830 may be volatile or non-volatile and may comprise a read-only memory (ROM), random-access memory (RAM), ternary content-addressable memory (TCAM), dynamic random-access memory (DRAM), and static random-access memory (SRAM). Memory 830 may be implemented using one or more disks, tape drives, solid-state drives, and/or the like. Memory 830 is operable to store the software instructions 160, machine learning algorithm 162, document image 106, document 104, noise artifacts 108, training dataset 164, test clean image 184, encoder 210, decoder 216, noise artifact removal module 214, device categories 840, processing capability threshold 846, threshold number of neural network layers 848, policies 850, threshold percentage 852, threshold range 854, data items 604, and/or any other data or instructions. The software instructions 160 may comprise any suitable set of instructions, logic, rules, or code operable to execute the processor 810.

Adapting Engine

Adapting engine 812 may be implemented by the processor 810 executing software instructions 160, and is generally configured to adapt the image noise reduction engine 154 to be deployed to a computing device 802 based on the processing capability 808 associated with the computing device 802, where the processing capability 808 is measured based on an average number of instructions that the computing device 802 processes per second.

In one embodiment, the adapting engine 812 may use the policies 850 to adapt the image noise reduction engine 154. The policies 850 may include rules that the adapting engine 812 follows to adapt the image noise reduction engine 154 for each computing device 802 based on the processing capability 808 associated with each computing device 802.

For example, a first policy 850 may indicate that if a processing capability 808 associated with a computing device 802 is below a threshold processing capability 846 (e.g., below 2000 instructions per second), the adapting engine 812 generates a first adapted version of the image noise reduction engine 844a that contains a number of neural network layers less than a threshold number of neural network layers 848 (e.g., less than 10 layers). The first policy 850 may further indicate that number of iterations to repeat the process of removing noise artifacts 108 from a document image 106 to be less than a threshold number (e.g., 20, 30, etc.).

The first policy 850 may further indicate that the first version of the image noise reduction engine 844a determines that a portion of a test clean image 184 that previously displayed a noise artifact 108 corresponds to a counterpart portion of a training clean image 166, if a first percentage of numerical values from the vector 188 more than a first threshold percentage 852 (e.g., 60%, 70%) correspond to or are within a first threshold range 854 (e.g., ±20%, ±30%) of their counterpart numerical values from the vector 170.

In other words, the first policy 850 may indicate that a threshold percentage and threshold range to determine that a portion of a test clean image 184 that previously displayed a noise artifact 108 corresponds to a counterpart portion of a training clean image 166 can be configured based on the processing capability 808 associated with the computing device 802.

For example, based on the first policy 850, the adapting engine 812 may assign a first threshold percentage, less than a threshold percentage 852, for determining that a portion of a test clean image 184 that previously displayed a noise artifact 108 corresponds to a counterpart portion of a training clean image 166, for computing devices 802 associated with processing capabilities 808 less than the threshold processing capability 846.

In another example, based on the first policy 850, the adapting engine 812 may assign a first threshold range of numerical values in vector 170, less than a threshold range 854, for determining that a portion of a test clean image 184 that previously displayed a noise artifact 108 corresponds to a counterpart portion of a training clean image 166, for computing devices 802 associated with processing capabilities 808 less than the threshold processing capability 846.

In another example, a second policy 850 may indicate that if a processing capability 808 associated with a computing device 802 is more than the threshold processing capability 864, the adapting engine 812 generates a second adapted version of the image noise reduction engine 844b that contains a number of neural network layers more than the threshold number of neural network layers 848.

The second policy 850 may further indicate that number of iterations to repeat the process of removing noise artifacts 108 from a document image 106 to be more than the threshold number (e.g., 20, 30, etc.).

For example, based on the second policy 850, the adapting engine 812 may assign a second threshold percentage, more than the threshold percentage 852, for determining that a portion of a test clean image 184 that previously displayed a noise artifact 108 corresponds to a counterpart portion of a training clean image 166, for computing devices 802 associated with processing capabilities 808 more than the threshold processing capability 846.

In another example, based on the second policy 850, the adapting engine 812 may assign a second threshold range of numerical values in vector 170, more than the threshold range 854, for determining that a portion of a test clean image 184 that previously displayed a noise artifact 108 corresponds to a counterpart portion of a training clean image 166, for computing devices 802 associated with processing capabilities 808 more than the threshold processing capability 846.

The adapting engine 812 classifies computing devices 802 based on their processing capability ranges 842 to different versions of the image noise reduction engine 844. For example, the adapting engine 812 classifies a first set of computing devices 802 that have processing capabilities 808 within a first processing capacity range 842a and/or less than the threshold processing capability 846 in a first device category 840a, and assigns a first version of the image noise reduction engine 844a that includes neural network layers less than the threshold number of neural network layers 848 to the first device category 840a.

In another example, the adapting engine 812 classifies a second set of computing devices 802 that have processing capabilities 808 within a second processing capability range 842b and/or more than the threshold processing capability 846 in a second device category 840b, and assigns a second version of the image noise reduction engine 844b that includes neural network layers more than the threshold number of neural network layers 848 to the second device category 840b.

Similarly, the adapting engine 812 may classify other computing devices 802 whose processing capabilities 808 in other ranges of processing capabilities 842 in other device categories 840, and assign other versions of the image noise reduction engine 844 to the other device categories 840 based on their respective processing capabilities 842.

In one embodiment, the adapting engine 812 may generate various versions of the image noise reduction engine 154 based on the policies 850 and implementing the operational flow 200 described in FIG. 2. For example, the adapting engine 812 generates the first version of the image noise reduction engine 154 that is directed to computing devices 02 with processing capabilities 808 within the processing capability range 842a and/or less than the threshold processing capability 846, as described below.

The image noise reduction engine 154 receives an image of a document 104 (i.e., document image 106), where the document image 106 contains a noise artifact 108 obstructing at least a portion of the document image 106. The adapting engine 812 uses a first number of neural network layers less than the threshold number of neural network layers 848 to extract a first set of features 178 from the document image 106. In this process, the adapting engine 812 may use the first number of neural network layers for implementing the first version of the image noise reduction engine 844a. For example, the adapting engine 812 may use the first number of neural network layers for implementing the encoder 210, the noise artifact feature removal module 214, and/or the decoder 216, such that the total number of neural network layers used in the first version of the image noise reduction engine 844a is less than the threshold number of neural network layers 848.

The first version of the image noise reduction engine 844a identifies noise artifact features 180 from the first set of features 178, similar to that described in FIGS. 1 and 2. The first version of the image noise reduction engine 844a generates a second set of features 186 by removing the noise artifact features 180 from the first set of features 178. The first version of the image noise reduction engine 844a generates a test clean image 184 based on the second set of features 186 as input, similar to that described in FIGS. 1 and 2. If the first version of the image noise reduction engine 844a determines that a portion of the test clean image 184 that previously displayed the noise artifact 108 corresponds with a counterpart portion of the training clean image 166, the first version of the image noise reduction engine 844a output the test clean image 184, similar to that described in FIGS. 1 and 2.

For generating the second version of the image noise reduction engine 154 that is directed to computing devices 802 with processing capabilities 808 within the processing capability range 842b and/or more than the threshold processing capability 846, the adapting engine 812 may use the second number of neural network layers to implement the encoder 210, the noise artifact feature removal module 214, and/or the decoder 216, such that the total number of neural network layers used in the first version of the image noise reduction engine 844a is more than the threshold number of neural network layers 848.

Operational Flow

The operational flow of the system 800 begins where the adapting engine 812 receives a request 804 from the computing device 802 to adapt the image noise reduction engine 154 for the computing device 802 based on the processing capability 808 associated with the computing device 802. For example, the request 804 may comprise an indication information indicating the processing capability 808. The adapting engine 812 compares the processing capability 808 with the threshold processing capability 846.

The adapting engine 812 determines to which device category 840 the computing device 802 belongs based on determining the processing capability 808 is within which processing capability range 842. For example, the adapting engine 812 may determine whether the processing capability 808 is greater or lesser than the processing capability threshold 846. For example, assume that the adapting engine 812 determines that the processing capability 808 is within the processing capability range 842a and/or less than the processing capability threshold 846. Thus, in this example, the adapting engine 812 determines that the computing device 802 belongs to the first device category 840a. Thus, the adapting engine 812 determines that the first version of the image noise reduction engine 844a needs to be sent to the computing device 802.

Therefore, the adapting engine 812 sends the first version of the image noise reduction engine 844a to the computing device 802 to be deployed and installed. In another example, if the adapting engine 812 determines that the processing capability 808 is within the processing capability range 842b and/or more than the processing capability threshold 846, the adapting engine 812 determines that the computing device 802 belongs to the second device category 840b. Thus, the adapting engine 812 sends the second version of the image noise reduction engine 844b to the computing device 802 to be deployed and installed.

Figure 9:
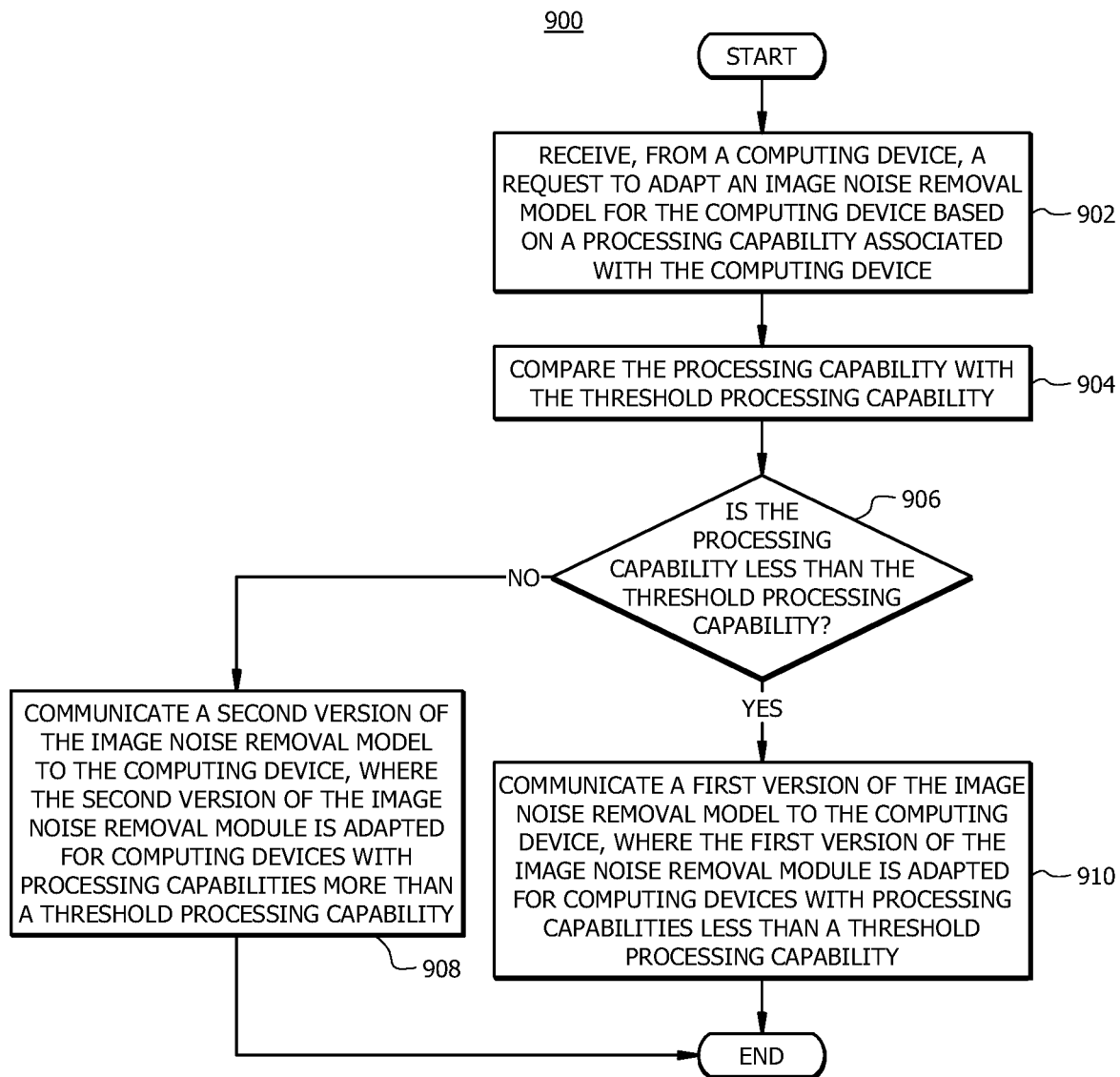
FIG. 9 illustrates an example flowchart of a method for adapting an image noise removal model based on a device's processing capability.

Example Method for Adapting an Image Noise Removal Model Based on a Device's Processing Capability FIG. 9 illustrates an example flowchart of a method 900 for adapting the image noise reduction engine 154 based on a processing capability 808 associated with a computing device 802. Modifications, additions, or omissions may be made to method 900. Method 900 may include more, fewer, or other steps. For example, steps may be performed in parallel or in any suitable order. While at times discussed as the system 800, processor 810, adapting engine 812, image noise reduction engine 154, or components of any of thereof performing steps, any suitable system or components of the system may perform one or more steps of the method 700. For example, one or more steps of method 900 may be implemented, at least in part, in the form of software instructions 160 of FIG. 8, stored on non-transitory, tangible, machine-readable media (e.g., memory 830 of FIG. 8) that when run by one or more processors (e.g., processor 810 of FIG. 8) may cause the one or more processors to perform steps 902-910.

Method 900 begins at step 902 where the adapting engine 812 receives a request 804 from the computing device 802 to adapt the image noise reduction engine 154 for the computing device 802 based on the processing capability 808 associated with the computing device 802.

At step 904, the adapting engine 812 compares the processing capability 808 with the threshold processing capability 846. In one embodiment, in this process, the adapting engine 812 determines to which device category 840 the computing device 802 belongs. For example, the adapting engine 812 compares the processing capability 808 with the processing capability ranges 842 to determine whether the processing capability 808 is within which processing capability range 842.

At step 906, the adapting engine 812 determines whether the processing capability 808 is lesser (or greater) than the threshold processing capability 846. In one embodiment, in this process, the adapting engine 812 determines to which device category 840 the computing device 802 belongs. If the adapting engine 812 determines that the processing capability 808 is within the processing capability range 842a and/or less than the threshold processing capability 846, method 900 proceeds to step 910. Otherwise, method 900 proceeds to step 908.

At step 908, the adapting engine 812 communicates the second version of the image noise reduction engine 844b to the computing device 802, where the second version of the image noise reduction engine 844b is adapted for computing devices 802 with processing capabilities 808 more than the threshold processing capability 846 and/or within the processing capability range 842b.

At step 908, the adapting engine 812 communicates the first version of the image noise reduction engine 844a to the computing device 802, where the first version of the image noise reduction engine 844a is adapted for computing devices 802 with processing capabilities 808 less than the threshold processing capability 846 and/or within the processing capability range 842a.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for adapting an image noise removal model based on a device processing capability, comprising:
   a computing device having a processing capability, wherein the processing capability is measured based at least in part upon an average number of instructions that the computing device processes per second; and
   a server, communicatively coupled with the computing device, and comprising:
      a memory operable to store:
         a first version of an image noise removal model having a first number of neural network layers, wherein:
            the image noise removal model is configured to remove noise artifacts from images;
            the first number of neural network layers is more than a threshold number of neural network layers;
            the first version of the image noise removal model is known to be used by devices having processing capabilities more than a threshold processing capability;
      a processor, operably coupled with the memory, and configured to:
         receive, from the computing device, a request to adapt the image noise removal model for the computing device, wherein the request comprises an indication information indicating the processing capability;
         compare the processing capability with the threshold processing capability;
         determine whether the processing capability is greater than the threshold processing capability; and
         in response to determining that the processing capability is greater than the threshold processing capability, communicate the first version of the image noise removal model to the computing device.

2. The system of claim 1, wherein:
   the memory is further operable to store a second version of the image noise removal model having a second number of neural network layers, wherein the second number of neural network layers is less than the threshold number of neural network layers; and
   the processor is further configured to, in response to determining that the processing capability is less than the threshold processing capability, communicate the second version of the image noise removal model to the computing device.

3. The system of claim 2, wherein the processor is further configured to generate the first version of the image noise removal model by:

receiving an image of a document, wherein the image contains a noise artifact at least partially obstructing a portion of the image;

extracting a first set of features from the image, wherein:
the first set of features represents at least one of shapes, symbols, numbers, and text in the image,
the first set of features is represented by a first vector of numerical values; and
extracting the first set of features from the image comprises feeding the image to the first number of neural network layers;

identifying noise artifact features from the first set of features, wherein the noise artifact features represent pixel values of the noise artifact;

generating a second set of features by removing the noise artifact features from the first set of features, wherein the second set of features is represented by a second vector of numerical values;

generating a test clean image of the document based at least in part upon the second set of features as an input;

comparing a portion of the test clean image that previously displayed the noise artifact with a counterpart portion of a training clean image to determine whether the noise artifact is removed from the test clean image, wherein the training clean image is free of noise artifacts;

determining whether the portion of the test clean image that previously displayed the noise artifact corresponds to the counterpart portion of the training clean image; and in response to determining that the portion of the test clean image that previously displayed the noise artifact corresponds to the counterpart portion of the training clean image, outputting the test clean image of the document.

4. The system of claim 3, wherein the processor is further configured to, in response to determining that the portion of the test clean image that previously displayed the noise artifact does not correspond to the counterpart portion of the training clean image:
adjust one or more weight values associated with the first set of features and the second set of features; and
determine whether the portion of the test clean image that previously displayed the noise artifact corresponds to the counterpart portion of the training clean image.

5. The system of claim 3, wherein removing the noise artifact features from the first set of features comprises:
identifying particular numerical values representing the noise artifact features from the first vector; and
filtering the particular numerical values, such that the particular numerical values are excluded in the second vector.

6. The system of claim 1, wherein the noise artifacts comprise at least one of a logo shape, a symbol, a letter, a number, and a background dot.

7. The system of claim 1, wherein the computing device comprises a scanner, an automated teller machine, a laptop, a desktop computer, a mobile phone, or a smartwatch.

8. A method for adapting an image noise removal model based on a device processing capability, comprising:
receiving, from a computing device, a request to adapt an image noise removal model for the computing device, wherein:
the computing device is associated with a processing capability;
the image noise removal model is configured to remove noise artifacts from images;
the request comprises an indication information indicating the processing capability; and
the processing capability is measured based at least in part upon an average number of instructions that the computing device processes per second;
comparing the processing capability with a threshold processing capability;
determining whether the processing capability is greater than the threshold processing capability; and
in response to determining that the processing capability is greater than the threshold processing capability, communicating a first version of the image noise removal model to the computing device, wherein:
the first version of the image noise removal model having a first number of neural network layers;
the first number of neural network layers is more than a threshold number of neural network layers; and
the first version of the image noise removal model is known to be used by devices having processing capabilities more than the threshold processing capability.

9. The method of claim 8, further comprising in response to determining that the processing capability is less than the threshold processing capability, communicating a second version of the image noise removal model to the computing device, wherein the second version of the image noise removal model has a second number of neural network layers less than the threshold number of neural network layers.

10. The method of claim 8, further comprising generating the first version of the image noise removal model by:
receiving an image of a document, wherein the image contains a noise artifact at least partially obstructing a portion of the image;
extracting a first set of features from the image, wherein:
the first set of features represents at least one of shapes, symbols, numbers, and text in the image;
the first set of features is represented by a first vector of numerical values; and
extracting the first set of features from the image comprises feeding the image to the first number of neural network layers;
identifying noise artifact features from the first set of features, wherein the noise artifact features represent pixel values of the noise artifact;
generating a second set of features by removing the noise artifact features from the first set of features, wherein the second set of features is represented by a second vector of numerical values;
generating a test clean image of the document based at least in part upon the second set of features as an input;
comparing a portion of the test clean image that previously displayed the noise artifact with a counterpart portion of a training clean image to determine whether the noise artifact is removed from the test clean image, wherein the training clean image is free of noise artifacts;
determining whether the portion of the test clean image that previously displayed the noise artifact corresponds to the counterpart portion of the training clean image; and
in response to determining that the portion of the test clean image that previously displayed the noise artifact corresponds to the counterpart portion of the training clean image, outputting the test clean image of the document.

11. The method of claim 10, further comprising, in response to determining that the portion of the test clean image that previously displayed the noise artifact does not correspond to the counterpart portion of the training clean image:
  adjusting one or more weight values associated with the first set of features and the second set of features; and
  determining whether the portion of the test clean image that previously displayed the noise artifact corresponds to the counterpart portion of the training clean image.

12. The method of claim 10, wherein removing the noise artifact features from the first set of features comprises:
  identifying particular numerical values representing the noise artifact features from the first vector; and
  filtering the particular numerical values, such that the particular numerical values are excluded in the second vector.

13. The method of claim 8, wherein the noise artifacts comprise at least one of a logo shape, a symbol, a letter, a number, and a background dot.

14. The method of claim 8, wherein the computing device comprises a scanner, an automated teller machine, a laptop, a desktop computer, a mobile phone, or a smartwatch.

15. A computer program comprising executable instructions stored in a non-transitory computer-readable medium that when executed by a processor causes the processor to:
  receive, from a computing device, a request to adapt an image noise removal model for the computing device, wherein:
    the computing device is associated with a processing capability;
    the image noise removal model is configured to remove noise artifacts from images;
    the request comprises an indication information indicating the processing capability; and
    the processing capability is measured based at least in part upon an average number of instructions that the computing device processes per second;
  compare the processing capability with a threshold processing capability;
  determine whether the processing capability is greater than the threshold processing capability; and
  in response to determining that the processing capability is greater than the threshold processing capability, communicate a first version of the image noise removal model to the computing device, wherein:
    the first version of the image noise removal model having a first number of neural network layers;
    the first number of neural network layers is more than a threshold number of neural network layers; and
    the first version of the image noise removal model is known to be used by devices having processing capabilities more than the threshold processing capability.

16. The computer program of claim 15, wherein the instructions when executed by the processor, further cause the processor to, in response to determining that the processing capability is less than the threshold processing capability, communicate a second version of the image noise removal model to the computing device, wherein the second version of the image noise removal model has a second number of neural network layers less than the threshold number of neural network layers.

17. The computer program of claim 15, wherein the instructions when executed by the processor, further cause the processor to generate the first version of the image noise removal model by:
  receiving an image of a document, wherein the image contains a noise artifact at least partially obstructing a portion of the image;
  extracting a first set of features from the image, wherein:
    the first set of features represents at least one of shapes, symbols, numbers, and text in the image,
    the first set of features is represented by a first vector of numerical values; and
    extracting the first set of features from the image comprises feeding the image to the first number of neural network layers;
  identifying noise artifact features from the first set of features, wherein the noise artifact features represent pixel values of the noise artifact;
  generating a second set of features by removing the noise artifact features from the first set of features, wherein the second set of features is represented by a second vector of numerical values;
  generating a test clean image of the document based at least in part upon the second set of features as an input;
  comparing a portion of the test clean image that previously displayed the noise artifact with a counterpart portion of a training clean image to determine whether the noise artifact is removed from the test clean image, wherein the training clean image is free of noise artifacts;
  determining whether the portion of the test clean image that previously displayed the noise artifact corresponds to the counterpart portion of the training clean image; and
  in response to determining that the portion of the test clean image that previously displayed the noise artifact corresponds to the counterpart portion of the training clean image, outputting the test clean image of the document.

18. The computer program of claim 17, wherein the instructions when executed by the processor, further cause the processor to, in response to determining that the portion of the test clean image that previously displayed the noise artifact does not correspond to the counterpart portion of the training clean image:
  adjust one or more weight values associated with the first set of features and the second set of features; and
  determine whether the portion of the test clean image that previously displayed the noise artifact corresponds to the counterpart portion of the training clean image.

19. The computer program of claim 17, wherein removing the noise artifact features from the first set of features comprises:
  identifying particular numerical values representing the noise artifact features from the first vector; and
  filtering the particular numerical values, such that the particular numerical values are excluded in the second vector.

20. The computer program of claim 15, wherein the noise artifacts comprise at least one of a logo shape, a symbol, a letter, a number, and a background dot.

* * * * *